(12) United States Patent
Barnard et al.

(10) Patent No.: US 12,117,406 B2
(45) Date of Patent: Oct. 15, 2024

(54) CHARGED PARTICLE DETECTION FOR SPECTROSCOPIC TECHNIQUES

(71) Applicants: VG System Limited, Altricham Chesire (GB); FEI Company, Brno (CZ)

(72) Inventors: Bryan Barnard, Nutley (GB); Pavel Stejskal, Brno (CZ)

(73) Assignees: VG Systems Limited, Cambridge (GB); FEI Company, Hillsboro, OR (US)

( * ) Notice: Subject to any disclaimer, the term of this patent is extended or adjusted under 35 U.S.C. 154(b) by 407 days.

(21) Appl. No.: 17/770,495

(22) PCT Filed: Nov. 9, 2020

(86) PCT No.: PCT/GB2020/052830
§ 371 (c)(1),
(2) Date: Apr. 20, 2022

(87) PCT Pub. No.: WO2021/090029
PCT Pub. Date: May 14, 2021

(65) Prior Publication Data
US 2022/0381713 A1    Dec. 1, 2022

(30) Foreign Application Priority Data

Nov. 7, 2019    (GB) ..................................... 1916226

(51) Int. Cl.
*G01N 23/2273*    (2018.01)
(52) U.S. Cl.
CPC ..... *G01N 23/2273* (2013.01); *G01N 2223/07* (2013.01); *G01N 2223/501* (2013.01)

(58) Field of Classification Search
CPC ........... G01N 23/2273; G01N 2223/07; G01N 2223/501
See application file for complete search history.

(56) References Cited

U.S. PATENT DOCUMENTS

| 5,583,336 A | 12/1996 | Kelly |
| 2004/0227070 A1 | 11/2004 | Harold et al. |

FOREIGN PATENT DOCUMENTS

| EP | 0537961 | 4/1993 |
| EP | 0602982 A1 | 6/1994 |
| EP | 0669635 A2 | 8/1995 |
| EP | 2998979 A1 | 3/2016 |
| GB | 2495221 A | 4/2013 |
| JP | S57152656 A | 9/1982 |
| WO | 20070147488 A1 | 12/2007 |

(Continued)

OTHER PUBLICATIONS

Combined Search and Examination Report dated Aug. 16, 2022, for GB Patent Application No. GB2210155.4.

(Continued)

*Primary Examiner* — Nicole M Ippolito
*Assistant Examiner* — Hanway Chang

(57) ABSTRACT

A method and apparatus for detection of charged particles in spectroscopy. Charged particles, received from an energy dispersive spectroscopic analyser as a charged particle beam, are accelerated towards a detector. The accelerated charged particles are received at an array of detecting pixels, the array of detecting pixels forming the detector. The charged particles arriving at the detector have a spread in the energy dispersive direction.

24 Claims, 9 Drawing Sheets

(56) References Cited

FOREIGN PATENT DOCUMENTS

WO     20110109311 A1    9/2011
WO     20150101820 A1    7/2015

OTHER PUBLICATIONS

International Search Report and Written Opinion mailed on Jan. 26, 2021, to PCT Application No. PCT/GB2020/052830.
Combined Search and Examination Report dated Apr. 27, 2020, issued to GB Patent Application No. 1916226.2.

CHARGED PARTICLE DETECTION FOR SPECTROSCOPIC TECHNIQUES

CROSS-REFERENCE TO RELATED APPLICATIONS

This application is a National Stage application filed under 35 USC § 371 of International Patent Application No. PCT/GB2020/052830, filed on Nov. 9, 2020. PCT Application No, PCT/GB2020/052830, claims priority to GB 1916226.2, filed Nov. 7, 2019, both of which are incorporated by reference herein in their entirety.

FIELD OF THE INVENTION

The invention relates to a method and apparatus for detection or counting of charged particles in spectroscopic apparatus. The invention further relates to an apparatus for X-ray Photoelectron Spectroscopy.

BACKGROUND TO THE INVENTION

Many types of spectroscopy require detection of charged particles such as ions or electrons. In particular, a number of spectroscopy techniques (such as X-ray Photoelectron Spectroscopy (XPS), Auger Electron Spectroscopy, Time-Of-Flight Spectroscopy, Ultraviolet Photoelectron Spectroscopy, Reflected Electron Energy Loss Spectroscopy and Ion Scattering Spectroscopy) require detection and counting of charged particles incident to a detector. Generally, in such techniques, the detector is used with an energy analyser which disperses the particles according to their energy so that the position of the particles exiting from the analyser can be used to determine the energy of the particles. A detector comprising multiple channels, at least in one direction, is therefore typically required to provide the most efficient detection.

A challenge to such detection techniques is the small signal produced by a single charged particle incident at a detector. Examples of conventional detectors used include a microchannel plate or an electron multiplier device. Both types of detector have the effect of turning a single electron incident at the detector into a signal of multiple electrons (for instance, more than $10^6$ electrons from each particle), which can in turn be readily counted by conventional electronics. The microchannel plate or electron multiplier device can then be coupled to a phosphor screen, lens and CCD, to a resistive anode, to a backgammon type anode or to a delay-line anode to encode the position at which charged particles were received. Such electron multiplication-type detectors can be used together with energy analysers in certain spectroscopic techniques (for example XPS), whereby the position of particles impinging at the detector indicates the extent of their deflection in an electrostatic field, and so provides information on the binding energy of the particle.

These types of detector are well established. However, they suffer from a number of drawbacks. For instance, such detectors have a limited lifetime (which is set by the charge received, and for microchannel plates might be 10-20 mC/cm², typically around 2 years of normal use), have a limited count rate (up to 40 mega counts per second) and are relatively expensive. Moreover, microchannel plates suffer from pulse pile up and overlapping pulses at high count rates. Finally, such techniques rely on the transmission of an analogue signal from the detectors within a vacuum of the spectroscopic apparatus, through a vacuum feedthrough, to electronics mounted outside the vacuum. To avoid reflections and losses in such a set-up is both difficult and expensive.

In the area of high energy particle physics, active pixel detectors have recently been developed which can directly detect individual particles incident at the detector, without the use of prior electron multiplication. These detectors make use of an array of semiconductor diodes and complementary metal-oxide-semiconductor (CMOS) technologies. These devices consist of pixelated arrays of detectors (for example, typically 256×256 pixels, although other sizes are possible) closely coupled to an array of CMOS preamplifiers. The small capacitance of each pixel (typically having a size of only around 55 µm×55 µm) and close coupling of a preamplifier to each individual pixel allows the detector to pulse count individual particles (or X-rays) arriving at each pixel. The large number (for instance 64,000) of independent pixels in the detector array allows an extremely high count rate to be achieved. Examples of such detectors include detectors in the MEDIPIX™ and TIMEPIX™ family, (for instance, TIMEPIX3™ described in US Patent Publication No. US 2012/012613) developed for use in high-energy physics experiments in collaboration with CERN, Geneva. Presently, such detectors typically have a minimum particle energy for detection of around 3 keV, and are not designed for detection of low-energy particles. Future designs of such detectors are expected to have a lower minimum particle energy for detection.

These types of active pixel detectors have been demonstrated to have potential in a range of applications, particularly where particles of high-energy are detected. In one example, Electron Backscattering Pattern (EBSP) imaging uses an accelerated primary beam incident to a sample to result in back-scattered electrons, which are subsequently detected. US Patent Publication No. US 2016/054240 describes generation of EBSP images using a MEDIPIX™ or TIMEPIX3™ detector. This makes use of the detectors to receive electrons with a primary beam energy of up to 30 keV, although in other, high-energy applications, the detectors can be used to detect particles of much higher energy (up to roughly 1 MeV).

However, the active pixel detectors described do not appear to be a good candidate for use in spectroscopy. Spectroscopy techniques such as those described above must accomplish accurate detection of low-energy particles. For instance, in XPS, photoelectrons from the sample are deaccelerated to an energy of typically 100 eV, or less, before entering an analyser. Particles exiting the analyser for detection are therefore relatively low-energy, and would not be readily detected at the 'active pixel' detectors described above.

Nevertheless, one option for use of the described detectors in mass spectroscopy is described in Jungmann et al. (*Int. J. Mass. Spectrom.* (2013), vol. 341, p 34-44). Here, particle multiplication techniques are applied prior to being received at a pixelated detector, and so the pixelated detector is used for read-out only. In particular, Jungmann et al. describes mass spectroscopy imaging using a chevron microchannel plate (MCP) immediately in front of a TIMEPIX™ detector. Charged particles exiting the mass analyser are incident at the microchannel plate, generating a single electron which is multiplied by the MCP to around $10^7$ electrons before being received at the detector. The MCP/TIMEPIX™ detector assembly is held at high voltage compared to the ion microscope from which ions were emitted. This is in order to overcome the limit of kinetic energy emission, and is typical in mass spectrometry. In an imaging scheme, Vallance et al. (*Phys. Chem. Chem. Phys* (2014), vol. 16, p 383-395) consider use of a scintillator, one or more microchannel plates and/or a phosphor screen to multiply the charge particle signal prior to the pixelated detectors. In a still further example, the Scienta Omnicron™ Argus CU™ detector uses a 128 channel strip anode detector with MEDIPIX™ family readout electronics (see https://www.scientaomicron.com/en/products/344/1110#page540, accessed 31 Oct. 2019). In this case, the MEDIPIX™ chip does not appear to be used as a detector, but instead is implemented as part of the readout electronics.

A further option for use of the pixelated detectors is described in Zha et al. (*IEEE Trans. Electron Devices*. (2012), vol. 59, p 3594). This document describes detection of electrons with a specially back-thinned CMOS active pixel sensor. The sensor was back thinned by a method involving lapping, reactive ion etching, and laser annealing to remove the substrate for the diode device and expose the epi-layer. Electrons having an energy of from 500 eV up to 2 keV were received at the back side (in particular, the epi-layer) of the CMOS detector. However, such processing steps for the sensor are complex and may have a low yield, and would not be directly applicable to commercially available detectors. Moreover, the lowest energy electrons detected using this design of detector was around 500 eV, which is significantly higher than the typical pass energy of a photoelectron passing through a hemispherical analyser for XPS (which is ~100 eV).

Thus, it is an objective of the present invention to provide a method and apparatus for detection of charged particles in spectroscopic techniques which overcome drawbacks of the detectors and detection techniques described above.

SUMMARY OF THE INVENTION

The present invention is a method and apparatus for detection of charged particles in spectroscopic techniques. The method requires the acceleration of charged particles exiting a spectroscopic analyser, in order to be directly received at an array of detecting pixels. No charged particle multiplication is required, such as MCP or phosphor plates. Instead, the method and apparatus are configured to accelerate the charged particles to an optimum energy for detection at the pixelated detector.

As a result of the acceleration applied, the pixelated detectors can be used without modification (such as thinning or removal of the device substrate) and yet still enable detection of charged particles with a low pass energy of around 100 eV (or even less). It also allows adaptation and optimisation of the system, dependent on the energy of particles to be detected, in contrast to systems which physically modify a detector chip. Moreover, use of the array of detecting pixels as a detector, rather than just for read-out as shown in some prior art systems, improves the resolution of measured data and avoids the use of components with a limited lifetime (such as an MCP). The described invention further allows for adjustment of the spectroscopic analyser image plane to match the detector size, to improve the efficiency for detection. Accordingly the described invention provides a viable and improved system for use of active pixel sensors to detect low energy charged particles in spectroscopy techniques such as XPS.

The presently described inventive technique requires acceleration of the charged particles prior to detection (for instance, by application of a force to the charged particles as they move through an electrostatic field). For this reason, the described technique is particularly useful for elemental particle spectroscopy (such as XPS, Auger or other spectroscopy using photoelectrons), in view of the low mass of such particles.

In a first example there is described a method for detection of charged particles in spectroscopy, the method comprising:

accelerating charged particles, received from a spectroscopic analyser, towards a detector; and receiving the accelerated charged particles at an array of detecting pixels, the array of detecting pixels forming the detector.

In particular, the method may be a method for detection of charged particles in spectroscopy in which the charged particles are analysed according to their energy.

In the described method, the charged particles exit the spectroscopic analyser (or energy analyser) and are then accelerated, before being incident at the detector. In particular, the charged particles are received directly at the detecting pixels of the detector (i.e. without any intervening component such as a microchannel plate or phosphor screen). The receiving surface of the array of detecting pixels forms the detecting surface, or image plane of the detector.

The spectroscopic analyser is an energy dispersive spectroscopic analyser, in which charged particles passed through the analyser (and subsequently arriving at the detector) have a spread in the energy dispersive direction proportional to their energy.

The array of detecting pixels comprises a plurality of detecting pixels, configured in an ordered arrangement or grid. The array of detecting pixels can be formed using an arrangement of more than one detector chip (each having a plurality of active pixels). For instance, detector chips may be 'tiled', e.g. comprise 1×2 detector chips, or 2×2 chips, or other arrangements. In an example, the array of detecting pixels may be formed of an arrangement of four Medipix chips (2×2), each comprising 256×256 pixels, thereby providing a detector array of 512×512 detecting pixels. In an array using several independent detectors, or in an array using a single detector with a large number of pixels, it becomes possible to record simultaneously a large number of energy channels in the energy dispersive direction (and so simultaneous measurement of a greater range of particles energies). This in turn allows the overall data acquisition times to be reduced.

Preferably, each detecting pixel is an active detecting pixel comprising a semiconductor diode, or more specifically a p-n junction. The active detecting pixel may be a CMOS device. As such, the detector comprises a two-dimensional array of p-n junction, each p-n junction in the array being comprised within a different pixel.

Preferably, the accelerated charged particles are received at an active layer of the semiconductor diode. In other words, the charged particles are first received at the dielectric layer comprising the active region (incorporating p-n junctions, or other active band structure of the diode). Electrons impinge on a detector diode and create electron-hole pairs in the depletion layer, which are then collected by an applied bias voltage. The charged particles are not received directly at the epi-layer or thinned substrate of the semiconductor diode.

Preferably, each detecting pixel is associated with an amplifier. Each active pixel comprises both a p-n diode (or photodetector) and an active amplifier, in contrast to a CCD for example. In contrast to CCD pixels, which merely acquire and transfer charge, each pixel comprises electronics which operate independently to detect and count particles.

Preferably, the amplifier of each detecting pixel of the detector is associated with a comparator and a counter. The amplifier (charge sensitive preamplifier, operational transconductance amplifier, or operational amplifier) may produce a voltage that is proportional to the total charge deposited by incoming charged particles at the semiconductor diode. The comparator acts to measure and digitise the analogue voltage output from the amplifier (in other words, it acts as an analogue-to-digital convertor). The counter can provide a count of the number of received charged particles based on the output from the comparator. The amplifier, comparator, and counter may be serially connected to the semiconductor diode. The small capacitance of each pixel (typically having a size of only 55 µm×55 µm, with a capacitance on the order of 100fF) and the close coupling to the amplifiers allows the detector to pulse count individual charged particles (or X-rays) arriving in each pixel. The large number of independent pixels (typically 64,000 pixels) in a detector array allow an extremely high count rate to be achieved.

Preferably, the charged particles are accelerated to at least a detection energy threshold, the detection energy threshold being the minimum energy of a charged particle for detection of the charged particle incident at a detecting pixel of the detector. In other words, the comparatively low energy charged particles exiting the spectroscopic analyser are accelerated to a higher energy, in order to be detected at the detecting pixels with sufficiently high signal-to-noise ratio. Ideally, the charged particles are accelerated to an energy to give optimum detection efficiency for the array of detecting pixels.

Optionally the detection energy threshold is greater than 3 keV, or may be greater than 5 keV. The detection energy threshold is dependent on the type of detector chip used (and the detecting pixels it comprises). In certain examples, the detection energy threshold may be greater than 2 keV, greater than 3 keV, greater than 5 keV, greater than 7 keV, or greater than 10 keV.

Optionally, the spectroscopic analyser is configured to have a pass energy of less than 500 eV. The pass energy is an energy dependent on the electrostatic field within a spectroscopic analyser, wherein only electrons close to a given energy (the pass energy) are able to pass through and exit the spectroscopic analyser (and so move onwards towards the detector). The pass energy can also be considered to represent the energy of particles passing through the exit of the spectroscopic analyser. The pass energy will generally be much less than the detection energy threshold (for instance, less than 2 keV, or less than 1 keV). In particular examples, the energy of the charged particles received from the spectroscopic analyser will be not greater than 1.5 keV, not greater than 1 keV, not greater than 750 eV, not greater than 400 eV, not greater than 300 eV, not greater than 200 eV, or not greater than 150 eV. The charged particles received from the spectroscopic analyser may have an energy in the range of 1 eV to 500 eV, or more preferably, 10 eV to 200 eV. Typically, for XPS the pass energy of the spectroscopic analyser is in the range 3-150 eV, but other types of spectroscopy (such as Auger electron spectroscopy) may result in a higher energy range.

Preferably, the detection energy threshold is at least ten times the pass energy of the spectroscopic analyser. In other words, the accelerating step may increase the energy of the charged particles by at least ten times (by an order of magnitude) before being received at the array of detecting pixels.

Preferably, the charged particles received from the spectroscopic analyser comprise a charged particle beam and, prior to receiving the accelerated particles at the detector, the method further comprising focussing the charged particle beam to change the magnification of the beam at the image plane at the detector. The image plane is the receiving surface of the detector (or more specifically, the receiving surface at the plurality of detecting pixels making up the array).

Preferably, focussing the charged particle beam to change the magnification of the charged particle beam comprises changing the cross-sectional area of the charged particle beam at the focal plane of the detector to substantially match at least one corresponding dimension of the array of detecting pixels at the detector.

Optionally, the spectroscopic analyser is an energy dispersive spectroscopic analyser, and wherein the cross-sectional area of the charged particle beam at the focal plane is changed such that the width of the charged particle beam in the energy dispersive direction substantially matches the corresponding dimension of the array of detecting pixels at the detector. In other words, the magnification may be changed such that the beam, in the energy dispersive direction, is received across approximately the full width of the array in the direction corresponding to the energy dispersive direction. Ideally, the width of the beam will not be greater than the width of the detector array in the same direction, in order to avoid loss (i.e. non-detection) of charged particles passed through the analyser. In an example, the magnification of the beam will be changed so that the width of the charged particle beam in the energy dispersive direction matches the dimension of the detector array in the same direction.

Preferably, a charged particle acceleration arrangement (which may be, or may be comprised within, charged particle optics) is arranged between the spectroscopic analyser and the detector accelerate the charged particles. More specifically, the charged particle optics are arranged between the exit to the spectroscopic analyser and the array of detecting pixels, and are configured to perform the accelerating step. The charged particle optics is an arrangement of components configured to accelerate the charged particles (in other words, a charged particle accelerator). It may comprise electrostatic lenses, or may be an arrangement in which voltages are applied between existing components in order to effect the acceleration.

Preferably, the charged particle optics focusses the charged particles (in addition to accelerating the charged particles). In other words the charged particle optics are configured to re-image the output plane of the spectroscopic analyser to match the receiving surface of the array of detecting pixels, as well as to accelerate the charged particles.

Preferably, the charged particle optics comprises at least two lens elements, the at least two lens elements arranged to perform the focussing step and the accelerating step.

In an alternative, the charged particle optics may comprise mesh elements to prevent penetration of the accelerating field and provide uniformity of the field. In this case, acceleration of the charged particles is achieved by maintaining a suitably high potential at the array of detecting pixels compared to the region at the exit to the spectroscopic analyser. The high potential is suitable to cause an accelerating field for the charged particles, towards the array of detecting pixels.

Optionally, a second lens element of the at least two lens elements is arranged downstream of the charged particle beam compared to a first lens element of the at least two lens elements, the second lens element having an applied voltage at least ten times the applied voltage of the first lens element. In this way, the charged particles are accelerated travelling between the first and second lens element. The second lens element may be at the same potential as the detector.

Optionally, the first lens element may be used to provide the focussing of the charged particle beam.

Optionally, the first lens element has an applied voltage, $V_1=1400+E_{pass}-E_k$, where $E_{pass}$ is the pass energy of the spectroscopic analyser, and $E_k$ is the electron kinetic energy.

Optionally, the second lens element has an applied voltage, $V_2=15000+E_{pass}-E_k$, where $E_{pass}$ is the pass energy of the spectroscopic analyser, and $E_k$ is the electron kinetic energy.

Preferably, the method further comprises applying an extraction field at the exit to the spectroscopic analyser, wherein the charged particle optics further comprises a third lens element, upstream of the first lens element, the third lens element arranged to apply the extraction field. The extraction field is an electrostatic field at the exit to the spectroscopic analyser which aids and directs the charged particles to leave the exit aperture of the analyser. The voltage applied to the third lens is scaled with respect to the pass energy of the analyser (typically, from 5-150 eV). In an example, the extraction field provided by the third lens is between 10-20 V/mm.

Preferably, the first and second lens elements having an applied voltage of an opposite polarity to the third lens element. Optionally, where the charged particles are photoelectrons, the third lens element has a negative applied voltage, and the first and second lens elements have a positive applied voltage. Optionally, the first and third lens elements have an applied voltage of the same order of magnitude.

Optionally, the third lens element has an applied voltage, $V_3=100-0.5E_{pass}-E_k$, where $E_{pass}$ is the pass energy of the spectroscopic analyser, and $E_k$ is the electron kinetic energy.

Preferably, the detector comprises an array of N rows and M columns of detecting pixels, wherein the method further comprises determining the number of charged particles received at each of the N×M detecting pixels. In an imaging mode for the spectrometer, the charged particle count from the N×M pixels can be represented as a 2-dimensional image of the analyser sample surface. For example, the described method (and apparatus) could be employed in the Thermo Scientific™ Theta Probe Angle-Resolved X-ray Photoelectron Spectrometer (ARXPS) System, or in the Thermo Scientific™ ESCALAB™ Xi+ X-ray Photoelectron Spectrometer (XPS) Microprobe to provide an image in this way.

Preferably, the spectroscopic analyser is operated in an energy dispersive mode, and the method further comprises, for each column of N detecting pixels, summing the number of charged particles determined to have been received at each detecting pixel in the column of detecting pixels, to determine a 1×M dimensional data vector comprising the sum for each column of N detecting pixels, the 1×M dimensional data vector representative of the spatial dispersion of the charged particles across one dimension of the image plane of the detector. In this way, a 'snapshot spectra' can be obtained from the spectroscopic analyser. In particular, by setting at least an appropriate pass energy and other operational parameters of the spectroscopic analyser, charged particles are dispersed according to their energy whilst travelling through the spectroscopic analyser (in a hemispherical analyser, the particles are dispersed in the radial direction). Therefore, the charged particles arrive at the receiving surface of the detector having a spread in the energy dispersive direction that is proportional to their energy. In some examples, the energy spread may be as much as 14% of the pass energy. Thus, by summing (or binning) the received charged particle count at each of the columns of detecting pixels in the direction perpendicular to the dispersive direction, a spectrum over a narrow energy range can be obtained. Further data processing may also be applied. In this way the array of detecting pixels may be used to imitate the 128 channels of a one-dimensional position sensitive detector (such as a conventional microchannel plate). As such, a spectra with a narrow energy scan can be obtained without scanning the operational parameters of the analyser, and so lower energy resolution data can be obtained relatively quickly. This is very useful for time resolved experiments, or to speed up depth profiling of a sample.

Preferably, the method further comprises adjusting the operational parameters of the spectroscopic analyser to analyse charged particles input to the spectroscopic analyser across a range of energies, wherein the operational parameters are adjusted at time intervals to span the range of energies of the inputted charged particles; determining a plurality of 1×M dimensional data vectors by, for each time interval, determining the 1×M dimensional data vector representative of the spatial dispersion of the charged particles across one dimension of the image plane of the detector for the operational parameters of the analyser during the time interval, and binning, for increments of particle energy, data elements of the plurality of 1×M dimensional data vectors, the binning comprising summing all elements of the plurality of 1×M dimensional data vectors that are associated with the increment of particle energy. In this way, a scanned spectroscopic spectra can be generated. Preferably, the extent of the acceleration of the charged particles may be adjusted in a manner corresponding to the adjustment of the operational parameters of the spectroscopic analyser, in order to maintain a constant relationship between the particles exiting the analyser and being incident at the detector.

In other words, during the accelerating and receiving steps of the method, the operational parameters of the spectroscopic analyser may be adjusted or stepped in order to 'scan' a range of charged particle energies. The operational parameters may be stepped, such that at each set of operational parameters during an interval or dwell time, a 1×M dimensional data vector representative of the spatial dispersion of the charged particles across one dimension of the image plane of the detector is obtained. The process is repeated for each set of operational parameters, until a plurality of 1×M dimensional data vectors are obtained. In view of the energy dispersion of the charged particles, each data element of a 1×M dimensional data vector is associated with a particle energy. Thus, the charged particle count of data elements associated with the same particle energy (or within the same increment of particle energy) across the plurality of 1×M dimensional data vectors can be binned (or summed), in order to provide a scanned spectra across the range of particle energies scanned by the analyser. In this way, the scanned spectroscopic spectra can be considered a sum of many energy shifted 'snapshot' spectra, as described above.

In general, the scanned spectroscopic spectra will be obtained with a relatively low pass energy at the spectroscopic analyser. The step size for the operational parameters of the spectroscopic analyser can be set to provide sufficient spectroscopic resolution. A survey spectra may be obtained in a similar manner to the scanned spectra, but in this case, the measurement is performed using a high pass energy at the spectroscopic analyser (providing a low resolution and large throughput), and a relatively large step size for the operational parameters of the analyser. Thus, the survey spectra can provide a low resolution spectra covering the entire possible energy range of the emitted photoelectrons.

Preferably, the spectroscopic analyser is operated in either an imaging mode or an energy dispersive mode. In one example, the spectroscopic analyser is operated in an energy dispersive mode to disperse the charged particles such that each charged particle is incident at the detector at a column of pixels that is representative of the energy of the charged particle. In an alternative example, the spectroscopic analyser is operated in an imaging mode such that each charged particle is incident at the detector at a pixel that is representative of a position in a sample from which the charged particle has originated. In an imaging mode, the electrons will pass through the spectroscopic analyser and so some separation based on the energy of the charged particles will likely be observed. As such, there may be energy selection in the imaging, and in some cases there will be energy dispersion and angular mapping coincidentally.

Optionally, the spectroscopic analyser is one of: an electrostatic hemispherical analyser; a cylindrical mirror analyser; time-of-flight analyser; parallel plate analyser, retarding field analyser. Any type of spectroscopic analyser which disperses charged particles according to their energy (in other words, an energy dispersive spectroscopic analyser) could be used.

Preferably, the method further comprises generating a digital signal for each detector pixel of the detector, the digital signal representative of the number of charged particles received at the detector pixel. Preferably, the method comprises passing the digital signal for each detector pixel through a vacuum feedthrough to a processor. The digital signal is generated by the diode, pre-amplifier, comparator and counter. Advantageously, this means a digital, rather than analogue, signal needs to be passed out of the vacuum chamber in which the detector resides. Passing analogue signals, especially at high speeds, from any device in vacuum and through a vacuum feedthrough is extremely difficult. To avoid reflections and losses each analogue signal must be carried by a coax cable and pass through a coaxial vacuum feedthrough. This is expensive and occupies a large space. Using the described detector, in which a channel would be required for each pixel, the complexity of the number of coaxial cables would be prohibitive. Accordingly, provision of a digital signal overcomes a number of these issues.

Optionally, the detector is mounted on a Printed Circuit Board (PCB), and the amplifier, the comparator and the particle counter are arranged on the PCB. As such, the detector can be mounted in a straightforward and compact way.

Optionally, the PCB provides a vacuum seal to an analysis chamber, the analysis chamber for housing at least the spectroscopic analyser and the detector.

Optionally, the PCB further provides the vacuum feedthrough for the digital signal. As such, the PCB may provide both the vacuum seal and the electrical feedthrough for signals to and from the detector.

Optionally, an interface for passing the digital signal to a processor is a bi-directional fibre optic link between the PCB and the processor. Advantageously, the fibre optic link allows data to be transferred from the detector (which may be floating at the energy detection threshold, for instance around 10 keV) to the processor. Beneficially, the fibre optic link is capable of USB3 data transfer rates.

In a second example there is described an apparatus for detection of charged particles in spectroscopy, comprising:
charged particle optics; and
an array of detecting pixels forming a detector;
wherein the arrangement of charged particle optics is configured to accelerate charged particles received from a spectroscopic analyser towards the detector, to be received at the array of detecting pixels.

In particular, there is described an apparatus for detection of charged particles in spectroscopy in which the charged particles are analysed according to their energy.

Charged particle optics (which may be an arrangement of charged particle optics, comprising electrostatic, or less preferably magnetic, lenses, or could be considered a charged particle accelerator) can accelerate and manipulate the charged particles emitted from the spectroscopic analyser. In particular, the charged particle optics can be used to accelerate the charged particles to an optimum energy for detection at the array of detecting pixels. The charged particle optics is arranged between the spectroscopic analyser and the detector.

The array may include at least 1,000 detecting pixels. In some examples, the array may include 128×128 pixels, in order to match the energy resolution of existing detectors. However, much larger arrays can be used, including a 256×256 (or more) pixel array, offering the possibility of much great energy resolution in the spectra. The spectroscopic analyser is an energy dispersive spectroscopic analyser, in which charged particles passed through the analyser (and subsequently arriving at the detector) have a spread in the energy dispersive direction proportional to their energy.

Preferably, each detecting pixel is an active detecting pixel comprising a semiconductor diode, and more specifically a p-n junction. The arriving charged particles generate electron/hole pairs in the semiconductor diode at each receiving pixel. This in turn generates a measureable current at the diode. Thus, charged particles are detected without use of any charged particle (photoelectron) multiplication.

Preferably, the accelerated charged particles are received at an active layer of the semiconductor diode. In other words, the charged particles are received at layers forming part of the function of the diode (including dielectric layers, or layers forming part of a p-n junction. The charged particles are not received at the substrate or epi-layer side of the semiconductor diode device. The apparatus according to the present invention avoids any complex semiconductor processing steps (such as back-thinning of the diode devices). The counts-per-second of the detector formed from the array of detecting pixels is significantly higher than typical detectors including microchannel plates or similar.

Preferably, each detecting pixel is connected to an amplifier. The amplifier is closely coupled to the semiconductor diode. Preferably, each detecting pixel (more specifically, each amplifier associated with a detecting pixel) is connected to a comparator and a counter. In other words, the amplifier is connected to an analogue-to-digital converter. The whole assembly of the detecting pixels, amplifier, comparator and counter are mounted within the vacuum, so that only digital signals need to pass through a vacuum feedthrough. This also increases the speed of read-out for the detecting pixels.

Preferably, the arrangement of charged particle optics is configured to accelerate the charged particles to at least a detection energy threshold, the detection energy threshold being the minimum energy of a charged particle for detection of the charged particle incident at a detecting pixel of the detector.

Preferably, the detection energy threshold is greater than 3 keV, or may be more than 5 keV. The detection energy threshold may be set as a percentage of the particle energy required for optimum detection efficiency of the given detecting pixels. The particle energy required for optimum detection efficiency may be determined by the thickness of the semiconductor diode active layers, and the extent of particle penetration into the active layers required for generation of a current at the device. The detection energy threshold may be more than 1.5 keV, more than 2 keV, more than 3 keV, more than 4 keV, more than 5 keV, more than 7 keV, more than 10 keV.

Preferably, the spectroscopic analyser is configured to have a pass energy of less than 500 eV. In other examples, the pass energy may be less than 1.5 keV, less than 1 keV, less than 750 eV, less than 400 eV, less than 300 eV, less than 200 eV, or less than 150 eV. Typically, for XPS the pass energy of the spectroscopic analyser is in the range 50-150 eV.

Optionally, the detection energy threshold is at least ten times (or an order of magnitude greater than) the pass energy of the spectroscopic analyser.

Preferably, the charged particles received from the spectroscopic analyser comprise a charged particle beam, and wherein an arrangement of charged particle optics is configured to focus the charged particle beam to change the magnification of the beam at the image plane at the detector. In other words, the charged particle optics are configured to change the cross-sectional area of the charged particle beam at the receiving surface of the array of detector pixels. Preferably, the arrangement of charged particle optics is configured to change the magnification of the charged particle beam, to match the cross-sectional area of the charged particle beam at the focal plane of the detector to substantially match at least one corresponding dimension of the array of detecting pixels at the detector. Beneficially, this allows the charged particle beam to be received across the maximum possible surface area of the array of detecting pixels, and so to optimise the number of charged particles received.

Optionally, the spectroscopic analyser is an energy dispersive spectroscopic analyser, and the arrangement of charged particle optics is configured to change the magnification of the charged particle beam such that the width of the charged particle beam in the energy dispersive direction substantially matches the corresponding dimension of the array of detecting pixels at the detector. Advantageously, the width of the energy dispersed charged particle beam is matched to be incident across the total number of columns of detecting pixels at the detector array, thereby maximising the efficiency of the detector.

Preferably, the arrangement of charged particle optics comprises at least two lens elements, the at least two lens elements arranged to focus and accelerate the charged particles. In particular, at least one of the lens elements can perform the focussing function, to change the size of the charged particle beam cross-section at the image plane of the detector. The acceleration function can be accomplished by application of a potential between the two lens elements, or between one of the lens elements and the exit of the spectroscopic analyser, or one of the lens elements and the detector. In other words, the arrangement of charged particle optics firstly accelerate the charged particles, and secondly re-image the output plane of the analyser to match the dimensions of the receiving surface of the array of detecting pixels. The lens elements may be electrostatic lenses, or less preferably, magnetic lenses.

In an alternative, the acceleration can be applied by application of a potential between the exit of the spectroscopic analyser and the array of detecting pixels, for instance by holding the detector at a comparatively higher potential. In this case, no lens elements are used, and the charged particle optics form part of the otherwise described apparatus.

In a further alternative, the charged particle optics comprise only a single lens element.

Optionally, a second lens element of the at least two lens elements is arranged downstream of the charged particles beam compared to a first lens element of the at least two lens elements. Optionally, the second lens element having an applied voltage at least ten times the applied voltage of the first lens element.

Optionally, the first lens element having an applied voltage an applied voltage, $V_1=1400+E_{pass}-E_k$, where $E_{pass}$ is the pass energy of the spectroscopic analyser, and $E_k$ is the electron kinetic energy.

Optionally, the second lens element has an applied voltage, $V_2=15000+E_{pass}-E_k$, where $E_{pass}$ is the pass energy of the spectroscopic analyser, and $E_k$ is the electron kinetic energy.

Preferably, the arrangement of charged particle optics further comprises a third lens element, configured to apply an extraction field at the exit to the spectroscopic analyser.

Preferably, the first and second lens elements having an applied voltage of an opposite polarity to the third lens element. Optionally, where the charged particles are photoelectrons, the third lens element has a negative applied voltage, and the first and second lens elements have a positive applied voltage. Optionally, the first and third lens element have an applied voltage of the same order of magnitude.

Optionally, the third lens element has an applied voltage, $V_3=100-0.5E_{pass}-E_k$, where $E_{pass}$ is the pass energy of the spectroscopic analyser, and $E_k$ is the electron kinetic energy.

Optionally, the apparatus further comprises the spectroscopic analyser, from which charged particles exit towards the arrangement of charged particle optics.

Optionally, the spectroscopic analyser is one of: an electrostatic hemispherical analyser; a cylindrical mirror analyser; time-of-flight analyser; parallel plate analyser, retarding field analyser.

The apparatus may comprise a controller for controlling the spectroscopic analyser (including applied electrostatic fields at the analyser), and a controller for read out and processing of data from the detecting pixels. The controller may be the same controller or two separate controllers. The controller may be linked to, or form part of a computer processor.

Preferably, the apparatus comprises a controller configured to adjust operational parameters of the spectroscopic analyser to analyse charged particles input to the spectroscopic analyser with a range of energies, wherein the operational parameters are adjusted to scan the range of energies of the inputted charged particles. In some cases, the extent of the acceleration of the charged particles may be adjusted parallel with the adjustment of the operational parameters of the spectroscopic analyser, in order to maintain a constant relationship.

Preferably, the detector comprises an array of N rows and M columns of detecting pixels, wherein the controller is further configured to determine the number of charged particles received at each of the N×M detecting pixels. For instance, the controller may receive the digital signal output from each of the semiconductor diodes forming the N×M detecting pixels, each coupled to a respective amplifier, comparator and counter. In an 'imaging mode' the controller can plot the count date received from the N×M detecting pixels as a two-dimensional image.

Optionally, the spectroscopic analyser is operated in an energy dispersive mode, wherein the controller is further configured to, for each column of N detecting pixels, sum the number of charged particles determined to have been received at each detecting pixel in the column of detecting pixels to determine a 1×M dimensional data vector comprising the sum for each column of N detecting pixels, the 1×M dimensional data vector representative of the spatial dispersion of the charged particles across one dimension of the image plane of the detector. In other words, the controller may be used to process the digital signal received from each individual detecting pixel, in order to sum the charged particle count read out from each detecting pixel in a column of the pixel array. In this way, the dispersion of the charged particle beam in the energy dispersive direction can be measured, and a spectroscopic spectra obtained. In a specific example, in which a 1×M dimensional data vector is obtained for a specific set of operational parameters of the spectroscopic analyser during a predetermined dwell time, the 1×M dimensional data vector can be plotted as a 'snapshot' energy spectra.

Preferably, the controller is configured to adjust the operational parameters at time intervals to span the range of energies of the inputted charged particles. As in typical spectroscopic measurements, the spectroscopic analyser electrostatic field, the pass energy and other apparatus variables, can be adjusted to pass the full range of charged particle energies within a sample through the spectroscopic analyser to the detector.

Preferably, the controller is further configured to determine a plurality of 1×M dimensional data vectors by, for each time interval, determining the 1×M dimensional data vector representative of the spatial dispersion of the charged particles across one dimension of the image plane of the detector for the operational parameters of the analyser during the time interval, and bin, for increments of particle energy, data elements of the plurality of 1×M dimensional data vectors, the binning comprising summing all elements of the plurality of 1×M dimensional data vectors that are associated with the increment of particle energy. In other words, each set of operational parameters of the spectroscopic analyser are held for a dwell time, and a 1×M dimensional data vector is generated for each set of operational parameters, representing the charged particle count in each column of pixels during the dwell time. Data elements representing a given increment of particle energy in the generated 1×M dimensional data vectors can be binned or summed to generate a full energy spectra.

Preferably, the amplifier, the comparator and the particle counter are configured to generate a digital signal for each detector pixel, the digital signal representative of the number of charged particles received at the detector pixel.

Preferably, the apparatus further comprises a Printed Circuit Board (PCB), the detector mounted on the PCB, and the amplifier, comparator and particle counter being arranged on the PCB.

Optionally, the apparatus further comprises a bi-directional fibre optic link for carrying the digital signal from the PCB to a processor.

Preferably, the PCB is configured to provide a vacuum seal to an analysis chamber, the analysis chamber for housing at least the spectroscopic analyser and the detector, the analysis chamber being sealable to contain a vacuum, and the PCB board is further configured to provide a vacuum feedthrough for the digital signal, for passing the digital signal from inside the analysis chamber to outside the analysis chamber.

In a third aspect there is described an X-ray photoelectron spectrometer comprising the apparatus, as described above, and an electrostatic hemispherical analyser, wherein the arrangement of charged particle optics is configured to accelerate photoelectrons received from the electrostatic hemispherical analyser towards the array of detecting pixels forming the detector.

Further illustrative examples are described by the following numbered clauses:

1. A method for detection of charged particles in spectroscopy, the method comprising:
   accelerating charged particles, received from a spectroscopic analyser, towards a detector; and
   receiving the accelerated charged particles at an array of detecting pixels, the array of detecting pixels forming the detector.
2. The method of clause 1, wherein each detecting pixel is an active detecting pixel comprising a semiconductor diode.
3. The method of clause 2, wherein each detecting pixel is associated with an amplifier, a comparator and a counter.
4. The method of any preceding clause, wherein the charged particles are accelerated to at least a detection energy threshold, the detection energy threshold being the minimum energy of a charged particle for detection of the charged particle incident at a detecting pixel of the detector.
5. The method of any preceding clause, wherein the charged particles received from the spectroscopic analyser comprise a charged particle beam and, prior to receiving the accelerated particles at the detector, the method further comprising:
   focussing the charged particle beam to change the magnification of the beam at the image plane at the detector.
6. The method of clause 5, wherein the spectroscopic analyser is an energy dispersive spectroscopic analyser, and wherein focussing the charged particle beam to change the magnification of the charged particle beam comprises changing the cross-sectional area of the charged particle beam at the focal plane such that the width of the charged particle beam in the energy dispersive direction substantially matches the corresponding dimension of the array of detecting pixels at the detector.
7. The method of any preceding clause, wherein charged particle optics arranged between the spectroscopic analyser and the detector accelerates the charged particles.
8. The method of clause 7, when dependent on clauses 5 or 6, wherein the charged particle optics are further configured to focus the charged particles.
9. The method of clause 8, wherein the charged particle optics comprise at least two lens elements, the at least two lens elements arranged to perform the focussing step and the accelerating step.
10. The method of any preceding clause, further comprising applying an extraction field at the exit to the spectroscopic analyser.

11. The method of clause 10, when dependent on clause 9, wherein the charged particle optics further comprise a third lens element, upstream of the first lens element, the third lens element arranged to apply the extraction field.
12. The method of clause 11, the first and second lens elements having an applied voltage of an opposite polarity to the third lens element.
13. The method of any one of clauses 1 to 5, or clauses 7 to 12, wherein the spectroscopic analyser is operated in an imaging mode such that each charged particle is incident at the detector at a detecting pixel that is representative of a position in a sample from which the charged particle has originated.
14. The method of any one of clauses 1 to 12, wherein the spectroscopic analyser is operated in an energy dispersive mode that disperses the charged particles such that each charged particle is incident at the detector at a column of detecting pixels that is representative of the energy of the charged particle.
15. The method of any preceding clause, wherein the detector comprises an array of N rows and M columns of detecting pixels, wherein the method further comprises:
determining the number of charged particles received at each of the N×M detecting pixels.
16. The method of clause 15, when dependent on clause 14, wherein the method further comprises:
for each column of N detecting pixels, summing the number of charged particles determined to have been received at each detecting pixel in the column of detecting pixels, to determine a 1×M dimensional data vector comprising the sum for each column of N detecting pixels, the 1×M dimensional data vector representative of the spatial dispersion of the charged particles across one dimension of the image plane of the detector.
17. The method of clause 16, further comprising:
adjusting operational parameters of the spectroscopic analyser to analyse charged particles input to the spectroscopic analyser across a range of energies, wherein the operational parameters are adjusted at time intervals to span the range of energies of the inputted charged particles;
determining a plurality of 1×M dimensional data vectors by, for each time interval, determining the 1×M dimensional data vector during the time interval, and:
binning data elements of the plurality of 1×M dimensional data vectors, the binning comprising summing all elements of the plurality of 1×M dimensional data vectors that are associated with the same increment of particle energy.
18. An apparatus for detection of charged particles in spectroscopy, comprising:
charged particle optics; and
an array of detecting pixels forming a detector;
wherein the arrangement of charged particle optics is configured to accelerate charged particles received from a spectroscopic analyser towards the detector, to be received at the array of detecting pixels.
19. The apparatus of clause 18, wherein each detecting pixel is an active detecting pixel comprising a semiconductor diode.
20. The apparatus of clause 19, wherein each detecting pixel is connected to an amplifier, a comparator and a counter.
21. The apparatus of any one of clauses 18 to 20, wherein the charged particle optics are configured to accelerate the charged particles to at least a detection energy threshold, the detection energy threshold being the minimum energy of a charged particle for detection of the charged particle incident at a detecting pixel of the detector.
22. The apparatus of any one of clauses 18 to 21, wherein the charged particles received from the spectroscopic analyser comprise a charged particle beam, and wherein the charged particle optics are further configured to focus the charged particle beam to change the magnification of the beam at the image plane at the detector.
23. The apparatus of clause 22, wherein the spectroscopic analyser is an energy dispersive spectroscopic analyser, and wherein charged particle optics are configured to change the magnification of the charged particle beam, such that the width of the charged particle beam in the energy dispersive direction substantially matches the corresponding dimension of the array of detecting pixels at the detector.
24. The apparatus of clause 22 or 23, wherein the charged particle optics comprise at least two lens elements, the at least two lens elements arranged to focus and accelerate the charged particles.
25. The apparatus of clause 24, wherein the charged particle optics further comprise a third lens element, configured to apply an extraction field at the exit to the spectroscopic analyser.
26. The apparatus of clause 25, wherein the first and second lens elements have an applied voltage with an opposite polarity to an applied voltage at the third lens element.
27. The apparatus of any one of clauses 18 to 26, further comprising:
the spectroscopic analyser, from which charged particles exit towards the charged particle optics.
28. The apparatus of any one of clauses 18 to 27, wherein the spectroscopic analyser is operated in an imaging mode such that each charged particle is incident at the detector at a pixel that is representative of a position in a sample from which the charged particle has originated.
29. The apparatus of any one of clauses 18 to 27, wherein the spectroscopic analyser is operated in an energy dispersive mode that disperses the charged particles such that each charged particle is incident at the detector at a column of pixels that is representative of the energy of the charged particle.
30. The apparatus of any one of clauses 18 to 29, wherein the detector comprises an array of N rows and M columns of detecting pixels, wherein the apparatus further comprising a controller configured to:
determine the number of charged particles received at each of the N×M detecting pixels.
31. The apparatus of clause 30, when dependent on clause 29, wherein the controller is further configured to:
for each column of N detecting pixels, sum the number of charged particles determined to have been received at each detecting pixel in the column of detecting pixels, to determine a 1×M dimensional data vector comprising the sum for each column of N detecting pixels, the 1×M dimensional data vector representative of the spatial dispersion of the charged particles across one dimension of the image plane of the detector.

32. The apparatus of clause 30 or 31, the controller further configured to: adjust operational parameters of the spectroscopic analyser to analyse charged particles input to the spectroscopic analyser with a range of energies, wherein the operational parameters are adjusted at time intervals to span the range of energies of the inputted charged particles.

33. The apparatus of clause 32, when dependent on clause 31, the controller further configured to:

determine a plurality of 1×M dimensional data vectors by, for each time interval, determining the 1×M dimensional data vector representative of the spatial dispersion of the charged particles across one dimension of the image plane of the detector for the operational parameters of the analyser during the time interval, and:

bin data elements of the plurality of 1×M dimensional data vectors, the binning comprising summing all elements of the plurality of 1×M dimensional data vectors that are associated with the same increment of particle energy.

34. An X-ray photoelectron spectrometer comprising:
the apparatus of any one of clauses 18 to 33; and
an electrostatic hemispherical analyser;
wherein the arrangement of charged particle optics is configured to accelerate photoelectrons received from the electrostatic hemispherical analyser towards the array of detecting pixels forming the detector.

DETAILED DESCRIPTION OF THE DRAWINGS

The present invention will now be described, by way of example only, with reference to the accompanying drawings, in which.

In the drawings, like parts are denoted by like reference numerals. The drawings are not drawn to scale.

DETAILED DESCRIPTION OF THE DRAWINGS

Figure 1:
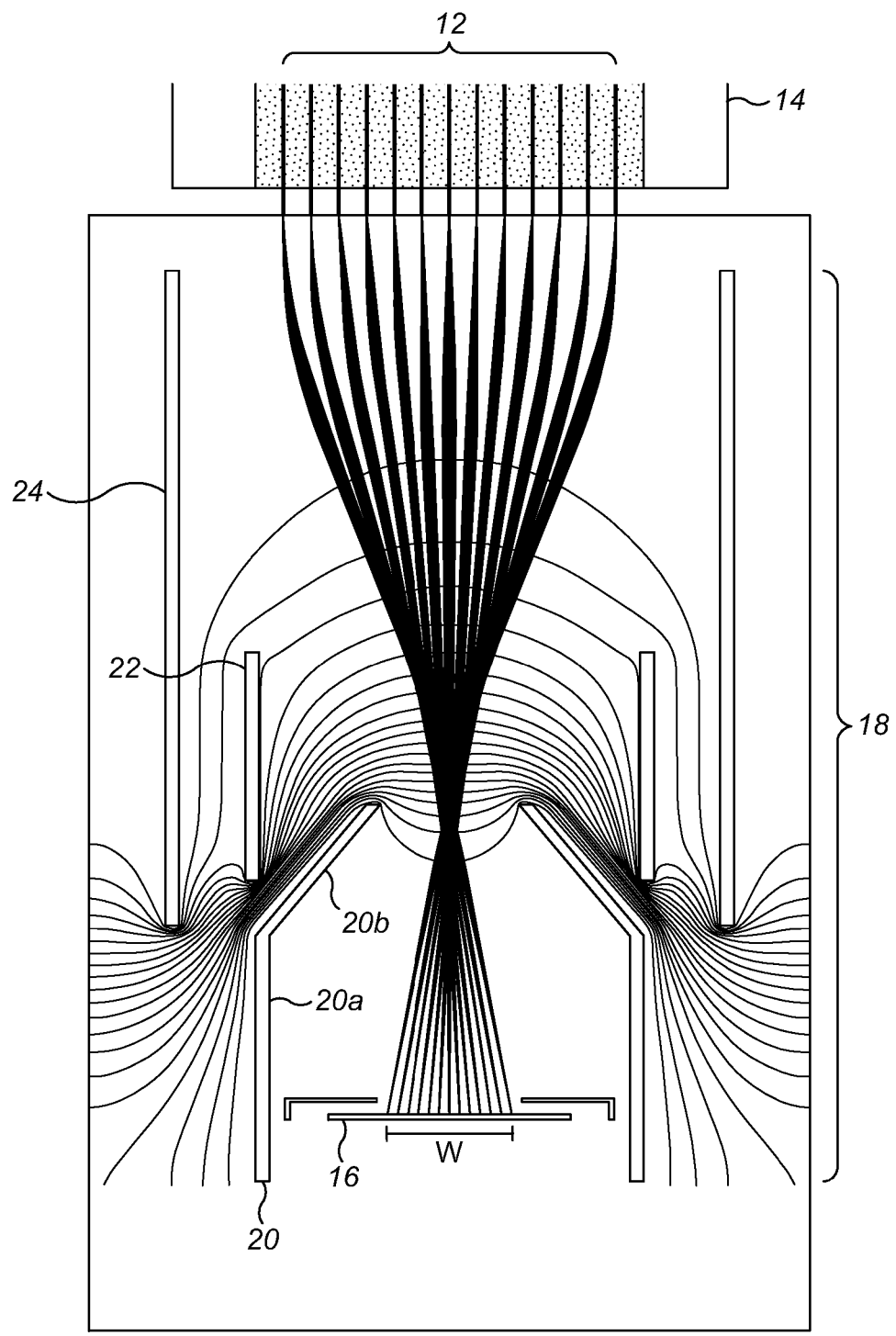
FIG. 1 is a schematic diagram of an apparatus for detection of charged particles in spectroscopy.

Referring to FIG. 1, there is shown an apparatus for detection of charged particles in spectroscopy. The apparatus may be applied in a number of different types of spectroscopy or elementary particle spectroscopic techniques, including X-ray Photoelectron spectroscopy, Auger Electron Spectroscopy, Ultraviolet Photoelectron Spectroscopy, Reflected Electron Energy Loss Spectroscopy, Time-of-Flight Spectroscopy and Ion Scattering Spectroscopy. The apparatus and associated method of detection may be used in a spectroscopy mode (especially useful for analysis resulting in temporal or spatial separation of particles with different energy, mass or charge characteristics) or in an imaging mode, as described below.

Charged particles (here represented by a spatially dispersed charged particle beam 12) exit from a spectroscopic analyser 14, and are received directly at a detector 16. The detector 16 comprises an N×M array of detecting pixels. In a particular example, the detector comprises an array of 256×256 detecting pixels, and so includes more than 64,000 pixels overall. In a specific example, the detector is a MEDIPIX™ or TIMEPIX™ detector array, but any detector comprising an array of active detecting pixels could be used (including any detectors in the MEDIPIX™/TIMEPIX™ family. Further description of the detector can be found below with reference to FIG. 2.

Between the exit of the spectroscopic analyser 14 and the detector 16 is arranged a configuration of lens elements, which together provide charged particle optics, which in this example is an electrostatic lens arrangement 18. The electrostatic lens arrangement 18 is configured to accelerate the charged particles of charged particle beam 12. As such, the velocity of charged particles incident at the detecting pixels of detector 16 is greater than the velocity of the charged particles exiting the spectroscopic analyser. This in turn means that the kinetic energy of the charged particles is increased (uniformly for all particles) as a result of acceleration by the electrostatic lens arrangement 18. Accordingly, the charged particles are incident at the detecting pixels of the detector with an energy closer to the optimum energy for detection at the detecting pixels. The specific energy will be determined by the design of the detecting pixel.

Nevertheless, there is no amplification (or multiplication) of the charged particles between the analyser 14 and the detector 16. The inventors have recognised that no such amplification is required when the charged particles incident at the detecting pixels have sufficient energy. For example, in the apparatus of FIG. 1 there is no conversion of the charged particles received from the spectroscopic analyser to secondary particles, such as secondary electrons, prior to reaching the array of detecting pixels. Thus, there is no electron multiplier (e.g. microchannel plate (MCP)), for example, between the analyser 14 and the detector 16. This is advantageous because such electron multipliers often have a limited lifetime of use. Furthermore, use of an MCP (or similar) often requires application of additional voltages, increasing the complexity of the detector circuits.

In use, the electrostatic lens arrangement 18 is configured to accelerate the charged particles to at least a minimum or threshold energy when incident at the detecting pixels of the detector 16. The minimum or threshold energy is the minimum energy for reliable detection at the detecting pixels. In the specific example of the MEDIPIX™ or TIMEPIX™ detector arrays, the threshold detection energy which must be exceeded for detection of charged particles is 5 keV, and more preferably 10 keV or even 15 keV for optimal detection efficiency. In some present examples, the threshold detection energy is between 5 keV and 15 keV, but in future designs of the pixelated detectors, the threshold energy may be much lower (for instance 2 keV).

FIG. 1 shows mathematically modelled acceleration and focussing electrostatic fields applied by the electrostatic lens arrangement 18 to the charged particles (shown as field lines in FIG. 1). The particular electrostatic lens arrangement of FIG. 1 makes use of three electrostatic lens elements 20, 22, 24, although other arrangements could be used, with different numbers of lenses.

As discussed above, the electrostatic lens arrangement is configured to accelerate eth charged particles to at least the threshold detection energy required for detection of the charged particles directly at the active pixels of the detector. In addition, the field generated by the electrostatic lens elements 18 of FIG. 1 is used to provide focussing and magnification of the charged particle beam. More specifically, the focussing field is used to change the width of the charge particle beam 12 at the point it is incident to the receiving detection surface of the detector 16 (known as the image plane of the detector). Ideally, the width, W, of the charged particle beam 12 is selected to match at least one dimension of the receiving detection surface of the detector 16, in order to optimise (and/or maximise) the number of detecting pixels at the detector capable of receiving charged particles. In some cases, the focussing field will therefore be a magnifying field (to increase the width, W, of the charged particle beam), but may also be a demagnifying field (to decrease the width, W, of the charged particle beam). When the analyser 14 is used in an imaging mode, the magnification may be modified to ensure the entire charged particle beam falls within the image plane of the detector 16. When the analyser 14 is used in a spectroscopy mode (in which the charged particles are dispersed primarily in one dimension, according to their energies), the magnification will be modified to ensure that the width, W, of the charged particle beam in the energy dispersive direction matches the image plane of the detector 16 in the corresponding dimension.

Accordingly, the specific configuration of the electrostatic lens arrangement 18 is selected to perform the accelerating and focusing functions described. In the particular example of FIG. 1, a cylindrical first lens element 22 is arranged to align with the exit to the spectroscopic analyser 14, such that the charged particle beam 12 exiting the analyser 14 passes through the cavity of the cylindrical first lens element 22. A second lens element 20 is arranged adjacent to, and spaced apart from, the first lens element 22. The second lens element 20 has a cylindrical portion 20a and a conical portion 20b, wherein a bore through the cylindrical 20a and conical 20b portions form an open cavity through which the charged particle beam 12 passes. The second lens element 20 is arranged such that the cylindrical portion 20a is downstream of the charged particle beam 12 from the first lens element 22, with the conical portion 20b of the second lens element 20 protruding into the cavity of the cylindrical first lens element 22.

Together, the first 22 and second 20 lens elements perform the majority of the accelerating and focussing functions described above. The first lens element 22 primarily acts to focus the charged particle beam 12, and change the width, W, of the charged particle beam 12 at the focal plane of the detector 16. The second lens element 20 primarily acts to accelerate the charged particles towards the detector 16, by application of a large potential at the second lens element 20 compared the first lens element 22 and other portions of the system (including the third lens element 24, and the analyser 14). Typically, the detector chip 16 will be held at the same potential as the second lens element 20. In one example, the second lens element 20 has an applied potential that is at least one order of magnitude, and preferably two orders of magnitude larger than the applied potential at the first lens element 22, in order to provide the required acceleration to the charged particles.

FIG. 1 also shows a third lens element 24, which is primarily to provide an extraction field, to draw the charged particles from the exit of the spectroscopic analyser 14. The third lens element 24 is cylindrical, and arranged aligned with the exit to the spectroscopic analyser 14, such that the charged particles pass through the bore of the third lens element 24 after exiting the analyser 14. It is also arrange circumferentially around the first lens element 22 (but spaced apart from it), such that at least part of the first lens element 22 extends through the cavity or bore of the third lens element 24. The cylindrical first lens element 22 extends through less than half the length of the cavity of the cylindrical third lens element 24. The voltage applied to the third lens element 24 is scaled with respect to the pass energy (usually in the range 5-150 eV) of the spectroscopic analyser 14. Typically, the third lens element 24 provides an extraction field of between 10-20 V/mm.

The accelerating, focussing and extraction functions are dependent on the specific configurations of the lens elements 20, 22, 24, including their shape, spacing and the voltages applied. The voltages applied to the lens elements 20, 22, 24 are scaled with the kinetic energy, $E_k$, and potential energy of the charged particles (in other words, scaled by the retardation applied to the charged particles, and so the pass energy, $E_{pass}$, of the spectroscopic analyser). In the particular example of FIG. 1, the voltage applied to the first lens element, $E_1$, the voltage applied to the second lens element, $E_2$, and voltage applied to the third lens element, $E_3$, is as follows:

$$E_1 = 1400 + E_{pass} - E_k$$

$$E_2 = 15000 + E_{pass} - E_k$$

$$E_3 = 100 - 0.5 E_{pass} - E_k$$

In a particular example, for a pass energy $E_{pass}=100$ eV and a photoelectron kinetic energy $E_k=1000$ eV, the approximate potentials applied to the three lens elements is $E_1=500$V, $E_2=14.1$ kV and $E_3=-950$V (for focussing, acceleration, and extraction, respectively).

It is noted that although cylindrical lens elements are discussed with relation to the example of FIG. 1, any shape of lens element could be used that is sufficient to perform the described functions (for instance a set of rods, or other lens configurations). It is also noted that although the third lens element 24 may be advantageous, it is not required to perform the focussing and accelerating functions of the described system.

Figure 2:
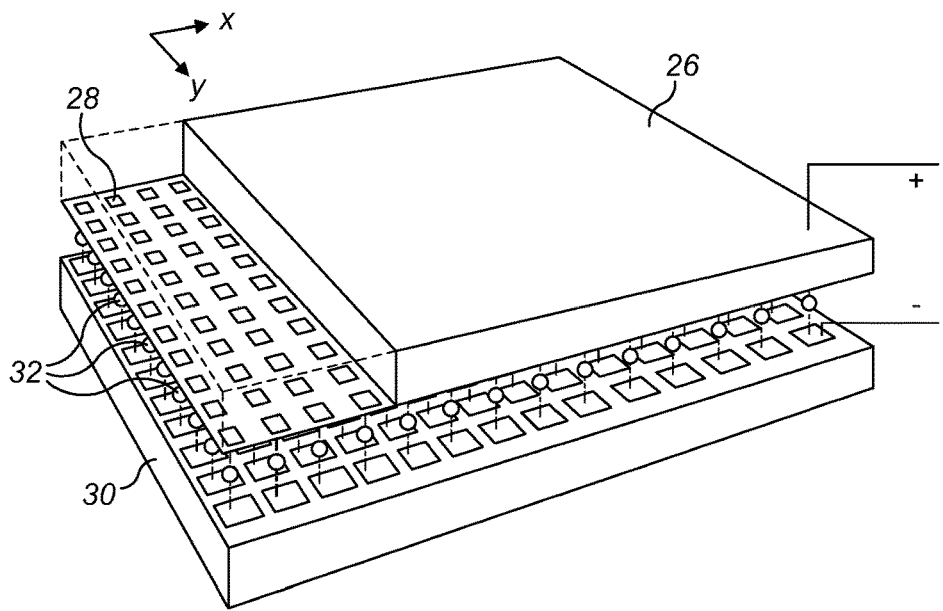
FIG. 2 is a schematic diagram of a detector having an array of detector pixels.

FIG. 2 shows a detector for use within the above described apparatus for detection of charged particles in spectroscopy. The detector incorporates a two-dimensional array of detecting pixels (in other words, the detector is pixelated). An example of a suitable detector array is the MEDIPIX™ or TIMEPIX™ detectors, as described in US Patent Publication No. US 2012/012613. Such detectors may be used for detection or sensing of radiations such as, for example, X-rays, electrons, gamma rays, alpha particles, charged particles, ions or neutrons.

The detector comprises a conversion layer 26 incorporating doped semiconductor materials in order to provide a plurality of semiconductor diodes (as described further below, with reference to FIG. 3). The conversion layer 26 acts to receive an incident radiation or charged particles, and to convert said radiation or particles into an electrical signal. Each of the semiconductor diodes represents a detector pixel.

The conversion layer 26 is connected to an electronic circuitry layer 30. Electrical components are arranged in the circuitry layer directly beneath each semiconductor diode. Each detecting pixel is connected to its own dedicated pixel electronics (detailed below with reference to FIG. 3), used for individual pixel readout of the electrical signal generated by each semiconductor diode. As such, each pixel is considered an 'active pixel', different to those in a charge-coupled device (CCD), for instance. The sets of dedicated pixel electronics are arranged in a planar array beneath the conversion layer 26, for example in an array of N×M pixel circuitry regularly arranged along the X and Y directions, as shown in FIG. 2. The conversion layer and electronic circuitry layer are connected by flip-chip bonding using solder bumps 32 at each pixel. Use of dedicated pixel electronics associated with each pixel (in particular, each pixel comprising both a diode and an active amplifier) allows for single pixel readout, and defines the detector as having an "active pixel array".

Figure 3:
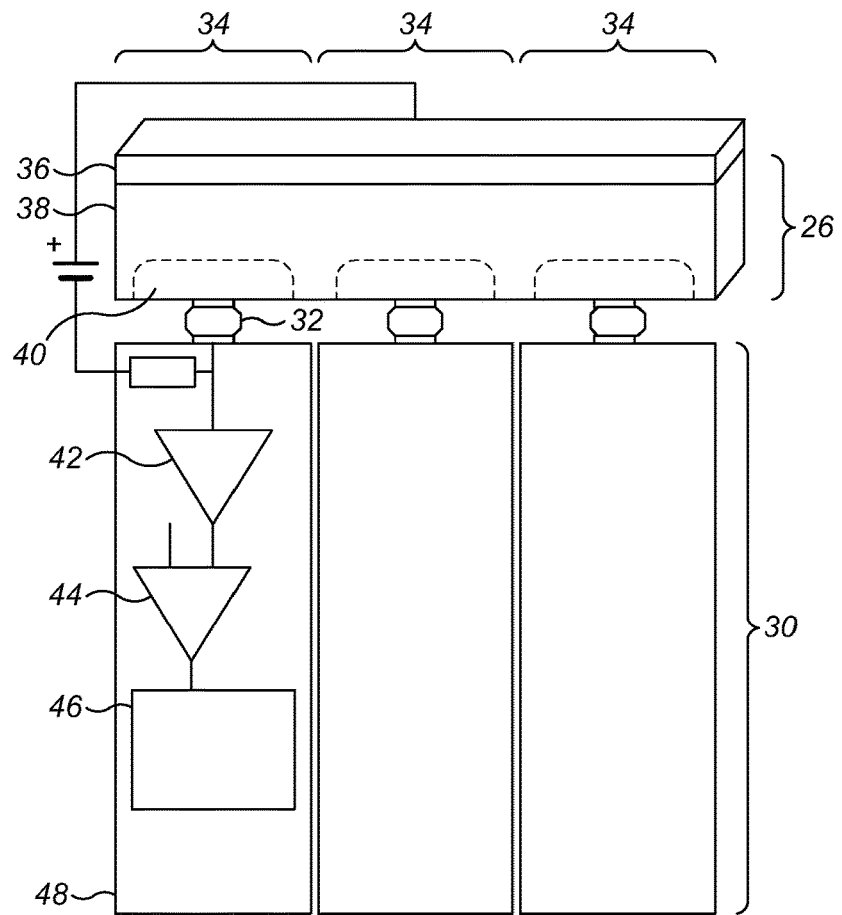
FIG. 3 is a schematic diagram showing pixel electronics associated with each pixel of the detector.

FIG. 3 is a schematic representation of the components comprising and connected to each detecting pixel. Each detecting pixel 34 comprises a p-n junction in the conversion layer 26, formed from a n- or p-type semiconductor material diffusion layer 36 on a semiconductor substrate 38, together with implanted regions 40 in the substrate (the implanted regions 40 being formed of a semiconductor material having an opposite type (p or n) compared to the diffusion layer 36). In the case of FIG. 3, the diffusion layer 36 comprises an n-type semiconductor material, and the implanted regions 40 are p-type. It will be understood that the diffusion layer and substrate layer are generally planar, with the implanted regions arranged as an array in the substrate. Each of the implanted regions 40 represent the area of a detecting pixel in the conversion layer. Although FIG. 2 shows an array of square pixels, it will be understood that the pixels may have any shape or array arrangement.

In use, charged particles (such as a photoelectrons) incident directly at the surface of the diffusion layer 36 diffuse through the diffusion layer 36 to the depleted region 38 resulting in creation of electron-hole pairs which number is proportional to the incident particle energy. Application of an applied bias across the conversion layer 26 cause the electron-hole pairs to move to an adjacent implanted region 40. Thus, a change in the electrical charge is apparent at electrical circuitry 30 bonded to each implanted region 40.

Each implanted region 40 is individually bonded (via solder bumps 32 using flip-chip bonding) to dedicated pixel electronics 48 in the electronic circuitry layer 30. Each implanted region 40 is electrically connected to an amplifier 42, in order to produce a voltage pulse with height proportional to the total charge deposited by incoming charged particles at the associated diode. The pixel electronics may comprise amplifier charge sensitive preamplifier, for instance.

Each amplifier 42 is serially connected to a comparator 44 associated with each detecting pixel. The comparator 44 detects whether a voltage output of each amplifier 42 is above or below a certain threshold which can be arbitrarily set for the whole chip. In doing so, the comparator 44 can act to digitise the analogue voltage output from the amplifier 42. As such, the comparator 44 functions as an analogue-to-digital convertor. As a result, the output to the comparator 44 provides a digital signal representative of the charge detected at the associated detecting pixel 34. A counter 46 can be connected to the output of each comparator 44, in order to provide a count of the number of charged particles received at each individual pixel.

Figure 4:
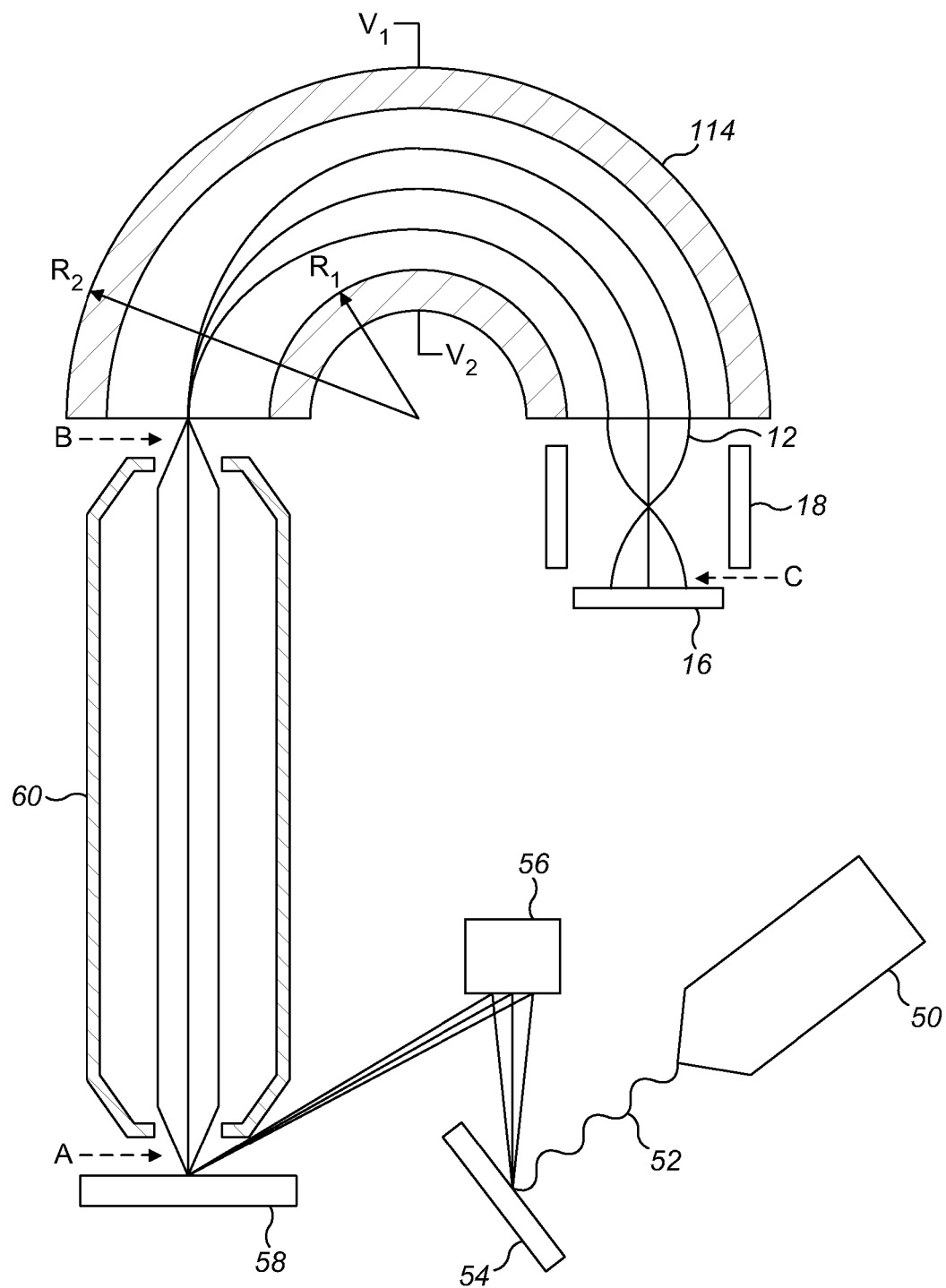
FIG. 4 is a schematic diagram of an X-ray photoelectron spectrometer.

FIG. 4 shows a schematic representation of an apparatus for X-ray photoelectron spectrometry (XPS) incorporating the apparatus of FIGS. 1 to 3. X-rays 52 are generated at an X-ray source 50, and passed via suitable optics 54 to an X-ray monochromator 56. The X-ray monochromator 56 is used to select a defined wavelength of radiation (e.g. Aluminium Kα rays). The selected X-ray radiation is directed to impinge on a sample 58, causing photoelectrons to be emitted as a result of the photoelectric effect. A lens system 60 (comprising an arrangement of electrostatic lenses) retards the photoelectrons to a band pass energy of an electrostatic hemispherical analyser 114 and further directs the photoelectrons to be input to the electrostatic hemispherical analyser 114 as a narrow, focused beam. Voltages $V_1$, $V_2$ applied to concentric hemispherical electrodes with radius $R_1$ and $R_2$ at the electrostatic hemispherical analyser 114 create an electrostatic field between them having a $1/R^2$ dependence (where R is the radial distance from the centre of the analyser 114). As a result, photoelectrons passing through the analyser 114 are radially dispersed depending on their kinetic energies.

At the exit of the electrostatic hemispherical analyser 114, the photoelectrons are spatially separated according to their energies. Knowledge of the radius of the path travelled by a particular photoelectron through the electrostatic hemispherical analyser 114, together with the electric field applied by the analyser, allows determination of the kinetic energy of a specific photoelectron at the exit of the analyser. The kinetic energy of the photoelectron is directly related to the binding energy, $E_b$, of the photoelectron at the sample according to the relationship $E_b = h\nu - E_k - \varphi$, where $h\nu$ is the energy of the radiation incident to the sample, $E_k$ is the kinetic energy of the emitted photoelectron, and $\varphi$ is the work function (dependent on the spectrometer and sample material).

In FIG. 4, the photoelectrons exiting the electrostatic hemispherical analyser 114 are received at a detector 16. The detector 16 is described above in relation to FIGS. 1 to 3, and comprises an array of detecting pixels. Between the exit of the electrostatic hemispherical analyser 114 and the detector 16, the photoelectrons pass through an arrangement of electrostatic lenses 18, as described above with reference to FIG. 1. The electrostatic lenses 18 are arranged to accelerate and focus the charged particles. Specifically, the charged particles are accelerated to increase the energy of the particles to exceed a detection energy threshold of the detector 16, whilst maintaining the relative positions of the charged particles. In general, photoelectrons generated in X-ray photoelectron spectroscopy (XPS) leave the sample with kinetic energies of up to 1486 eV. However, before entry to the analyser, the photoelectrons are retarded to the "pass energy" of the analyser. The photoelectrons of the pass energy subsequently traverse around the analyser and then exit at this energy. In XPS, typical "pass energies" used for an electrostatic hemispherical analyser are between 3 and 200 eV. Therefore, the electrostatic lens arrangement 18 is configured to accelerate photoelectrons exiting the spectroscopic analyser within this energy range to at least the detection energy threshold of the detector. As such, the energy of charged particles emitted from the surface of the sample (at point A in FIG. 4), will be higher than the energy of charged particles after passing through the lens system 60 and a deaccelerating mesh (at point B in FIG. 4), at which they will be at the pass energy of the spectroscopic analyser. However, after acceleration (at point C in FIG. 4), the charged particles will have a significantly higher energy than at either point A or B in FIG. 4 (for instance, having an energy increased by around two orders of magnitude compared to the pass energy).

The arrangement of electrostatic lenses 18 furthermore changes the width of the beam of photoelectrons, as discussed above with reference to FIG. 1. In particular, the width of the photoelectron beam is magnified or demagnified to match the width of the surface of the detector 16 upon which the photoelectrons are incident. Changing the width of the beam in this way maximises the number of detector pixels within the output field of the photoelectron beam and can provide that the full spatial spread of photoelectrons exiting from the analyser is incident on the detection surface.

In general, energy-dispersive spectroscopy looks to obtain a spectra for a sample over a range of energies. Where a spectra is required over a wide range of energies, the potentials applied at the electrostatic hemispherical analyser 114 are adjusted (or scanned) accordingly. In the arrangement of the present invention, the acceleration applied by the electrostatic lens arrangement 18 may also be adjusted or scanned, in order to provide an appropriate acceleration to charged particles exiting the analyser 114, prior to being received at the detector 16.

In particular, in a typical spectroscopy mode, in which the photoelectrons are spatially dispersed according to their energy at the spectroscopic analyser 14, the electrostatic lens arrangement 18 must be configured to accelerate the photoelectrons to at least a detection energy threshold of the detector 16 (where the detection energy threshold is the minimum energy of an incident photoelectron for detection at a detecting pixel of the detector 16). In this mode, the photoelectrons may be accelerated to the same energy at the point they are incident at the detector 16, as the analysis of the energy of the charged particles is allowed by the relative position at which they are incident at the detector 16 (due to the energy-to-spatial dispersion provided by the electrostatic hemispherical analyser 114).

In an alternative, the apparatus may be used in an imaging mode. In this case, photoelectrons pass through the spectroscopic analyser and are uniformly accelerated to an energy greater than the detection energy threshold. The particles are then received at the array of detecting pixels, from which the charged particle count of each pixel across the array can be read-out and presented as a two-dimensional image.

Figure 5A:
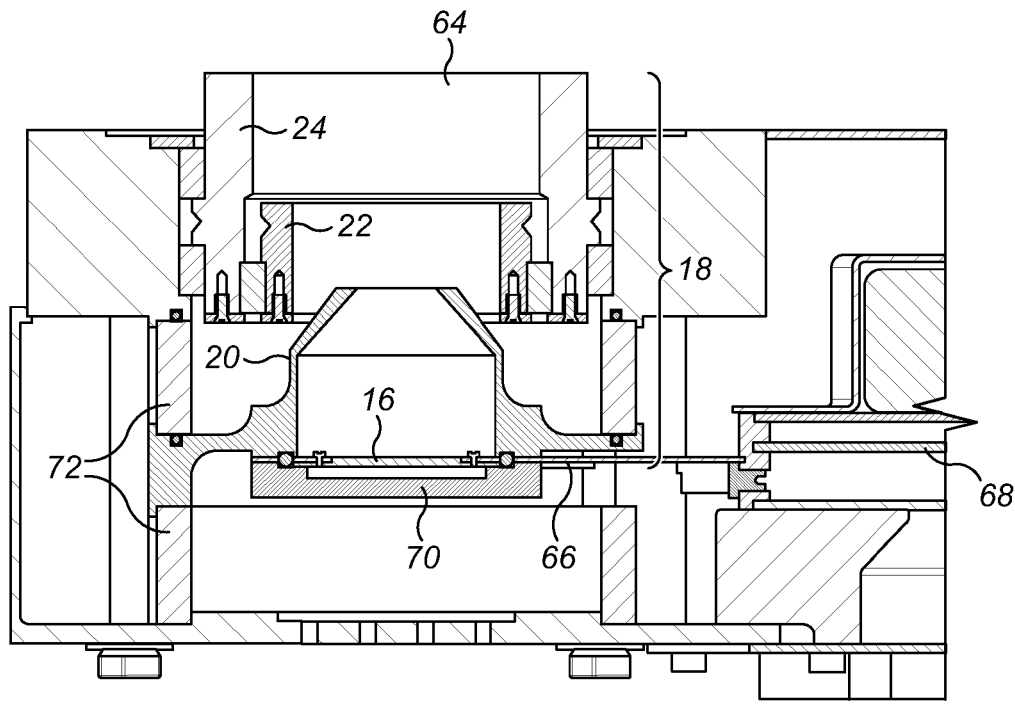
FIG. 5A is a cross-section of the apparatus for detection of charged particles in spectroscopy.
Figure 5B:
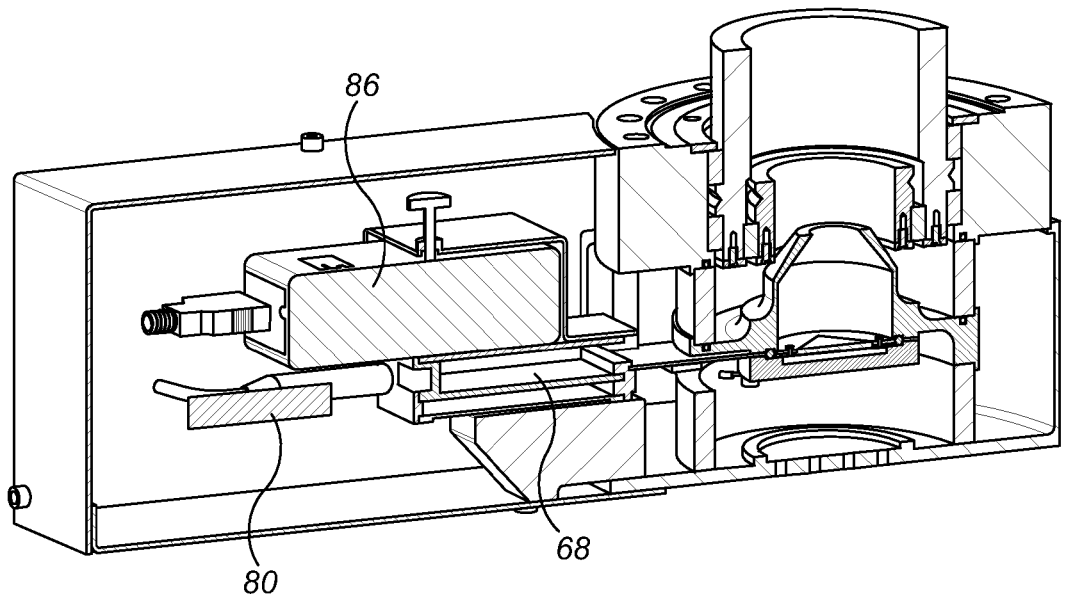
FIG. 5B is a different cross-sectional view of the apparatus for detection of charged particles in spectroscopy shown in FIG. 5A.
Figure 6:
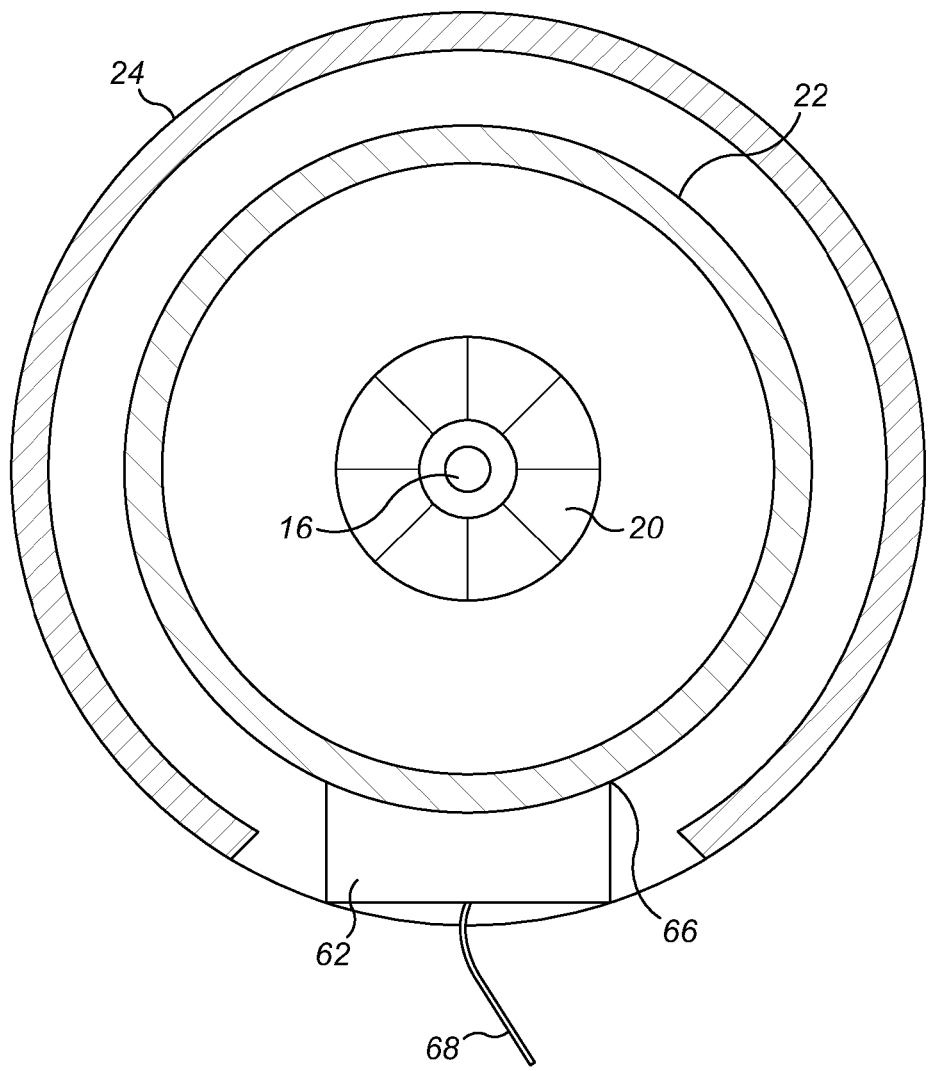
FIG. 6 is a plan view of the apparatus of FIGS. 5A and 5B.

FIGS. 5A and 5B shows cross-sectional views of a specific electrostatic lens 18 and detector 16 arrangement used in an example X-ray photoelectron spectrometer (for example, as shown in FIG. 4). FIG. 6 shows a plan view of a number of the elements of the apparatus shown in FIGS. 5A and 5B.

In FIGS. 5A, 5B and 6, the detector is mounted on a Printed Circuit Board (PCB), which comprises the pixel electronics 48 (amplifier, comparator and counter) described above with reference to FIG. 3. Three electrostatic lens elements 20, 22, 24 (as shown in FIG. 1) are arranged in relation to the detector 16. A second electrostatic lens element 20 is arranged surrounding the detector, with first 22 and third 24 electrostatic lens elements comprising concentric electrodes positioned around, and spaced apart from, the second electrostatic lens element 20. The third, first and second electrostatic lens elements, respectively, are arranged in series in the direction of travel of the charged particles towards the detector.

The third electrostatic lens element 24 primarily serves to extract and collimate the photoelectrons from the exit of the analyser 114. The first electrostatic lens element 22 primarily serves to focus the charged particles beam, setting the magnification to adjust the width of the beam, preferably to fill the detection area of the detector. The second electrostatic lens element 20, primarily provides the necessary acceleration to the photoelectrons before they strike the detector 16.

The first and third electrostatic lens element 22 and 24 are each in the form of cylindrical electrodes. The cylindrical electrode of the third electrostatic lens element 24 has a greater diameter than the cylindrical electrode of the first electrostatic lens element 22, and is at least partially concentric with the first lens element 22. The second electrostatic lens element 20, is configured as an electrode with a cylindrical portion and a conical portion, with at least the conical portion concentric with the first lens element 22. The shape of the conical end of the first electrostatic lens element acts to minimise spherical aberrations. In use, the photoelectrons pass through the bore of the third lens element 24, the first lens element 22 and the second lens element 20, respectively. The detector 16 is mounted downstream at the cylindrical end of the second electrostatic lens element 20.

The cavity 64 in which the detector 16 is mounted forms part of an analysis chamber of the spectrometer. The length of the cavity can be adjusted to match the focal length of the lens to the output or image plane of the spectroscopic analyser. The analysis chamber may also house the spectroscopic analyser and sample, for instance (not shown in FIGS. 5A and 5B). The analyser and sample could be arranged as shown in FIG. 4 for XPS but may be arranged differently for other forms of spectroscopy as known in the art. During measurement of a spectra, the analysis chamber is maintained under a vacuum.

In the specific example of FIGS. 5A and 5B, the PCB forms a vacuum seal between the analysis chamber and the outer atmosphere. A digital signal for each detecting pixel, generated by the pixel electronics 48 (described above) at the PCB, can be passed out of the vacuum chamber to a computer processor (not shown). In this way, the PCB provides a vacuum feedthrough 66 for the digital signals.

Figure 7:
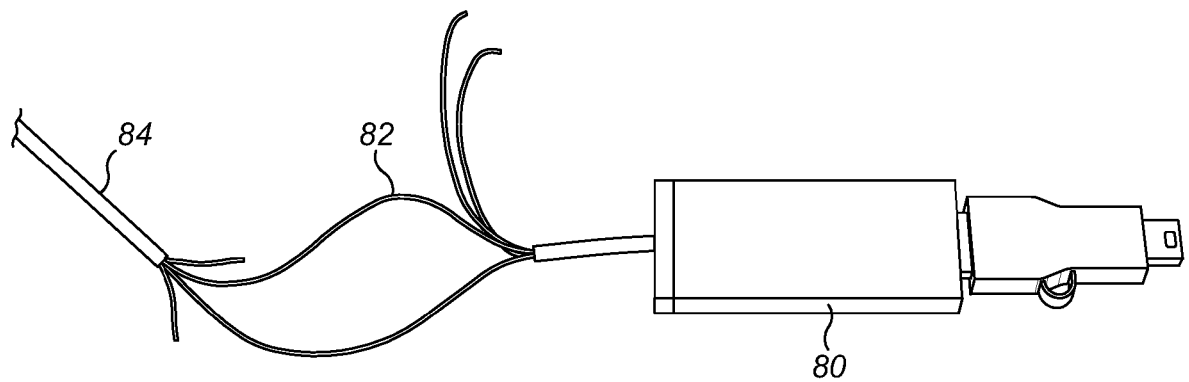
FIG. 7 is a schematic diagram of a bi-directional fibre optic USB interface.

An interface 68 to carry the digital signals from the PCB to a processor is also shown in FIG. 5B. Here, the interface is implemented as a bi-directional fibre optic universal serial bus (USB) interface, as shown in FIG. 7. The interface provides a fibre optic USB interface 80 to the PCB board (and so the pixel electronics), connected via a fibre optic connection 82 to a fibre optic USB interface 84 at a computer processor. The fibre optic connection 82 provides 15 kV isolation between the PCB and the processor, which is particularly necessary when the detector 16 and at least elements of the electrostatic lens assembly 18 are operated at a high 'floating' voltage compared to a potential of the surrounding spectrometer apparatus. For instance, the detector, and its associated electronics, can be floated at an elevated voltage, of up to 15 kV (e.g. 1-15 kV or 5-15 kV). The detector and electronics can be floated using a high voltage power supply.

It is noted that generation of a digital signal provides significant advantages compared to conventional detectors (such as microchannel plate detectors and electron multipliers), which generate analogue signals. Passing analogue signals, especially at high speeds, from a device in vacuum through a vacuum feedthrough is extremely difficult. To avoid reflections and losses each signal must be carried by a coax cable and passed through a coaxial vacuum feedthrough. This is expensive and occupies a large space. In comparison, the digital signal can be passed out of a vacuum using the PCB and interface described above. This not only provides a high speed, low-noise interface, but also allows transmission of a large number of different signals (such as obtained by the plurality of active pixels in the detector array) through only a small feedthrough area.

As will be understood by the person skilled in the art, further modifications may be made to the apparatus of FIGS. 5A and 5B, for example, inclusion of a heat sink 70 in connection with the detector 16, and high voltage insulators 72 arranged with respect to the electrostatic lens arrangement 18. A floating USB power supply 86 may also be connected.

In XPS, it is necessary to individually count the number of photoelectrons of a specified energy which are emitted from the sample when irradiated with X-rays. Photoelectrons of the energy of interest are selected by a hemispherical analyser and after exiting the analyser are counted by a detector and pulse counting electronics. In a spectroscopy mode, the analyser is energy dispersive so that the position of photoelectrons at the exit from the analyser can be used to determine the energy of the electrons. The energy of electrons leaving the analyser is generally linearly dependent on their position, and thus an energy spectrum can be generated by plotting the charged particle count across the width of the array of pixels of the detector.

In a specific example, the detector assembly described above in relation to FIGS. 1 to 3 has been mounted onto a Thermo Scientific™ Nexsa™ XPS spectrometer. Specifically, the detector used comprised a 256×256 array of detecting pixels. The photoelectron beam was focussed by the electrostatic lens arrangement to match the width of the surface of the detector. Thus, the photoelectron beam spanned all 256 columns of pixels at the detector.

Figure 8:
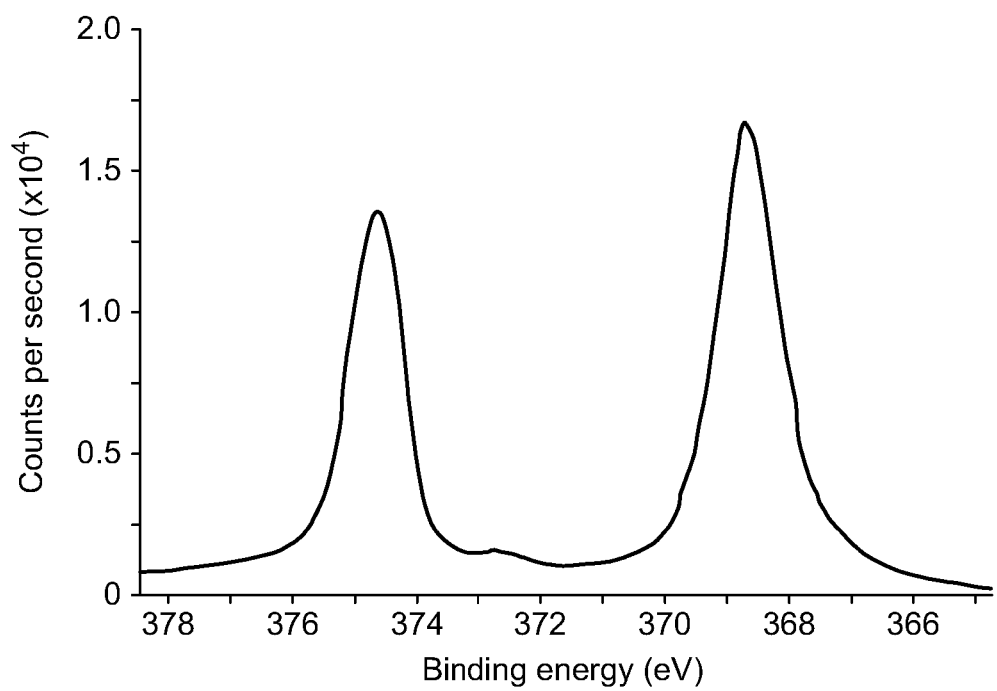
FIG. 8 is a plot showing an example "snapshot" spectra using the described apparatus.

FIG. 8 shows a "snapshot" spectrum obtained using this experimental apparatus, with the analyser of the XPS spectrometer set to the photoelectron energy of the Ag3d doublet peak (using X-ray radiation of 1486.6 eV). All voltages at the analyser and the electrostatic lens arrangement remained constant. The electrostatic lens arrangement 18 was configured to accelerate the photoelectrons to have an energy of at least 10 keV.

The snapshot spectrum is a result of rapid simultaneous detection of the beam across the 256 columns of pixels of the detector. In particular, the snapshot spectrum (plotting binding energy vs. counts of photoelectrons per second) is representative of the total number of photoelectrons detected at detecting pixels in each of the 256 columns of the pixel array at the detector. The x-axis is associated with the spatial and energy dispersion of the photoelectrons across the 256 columns of detecting pixels.

Figure 11:
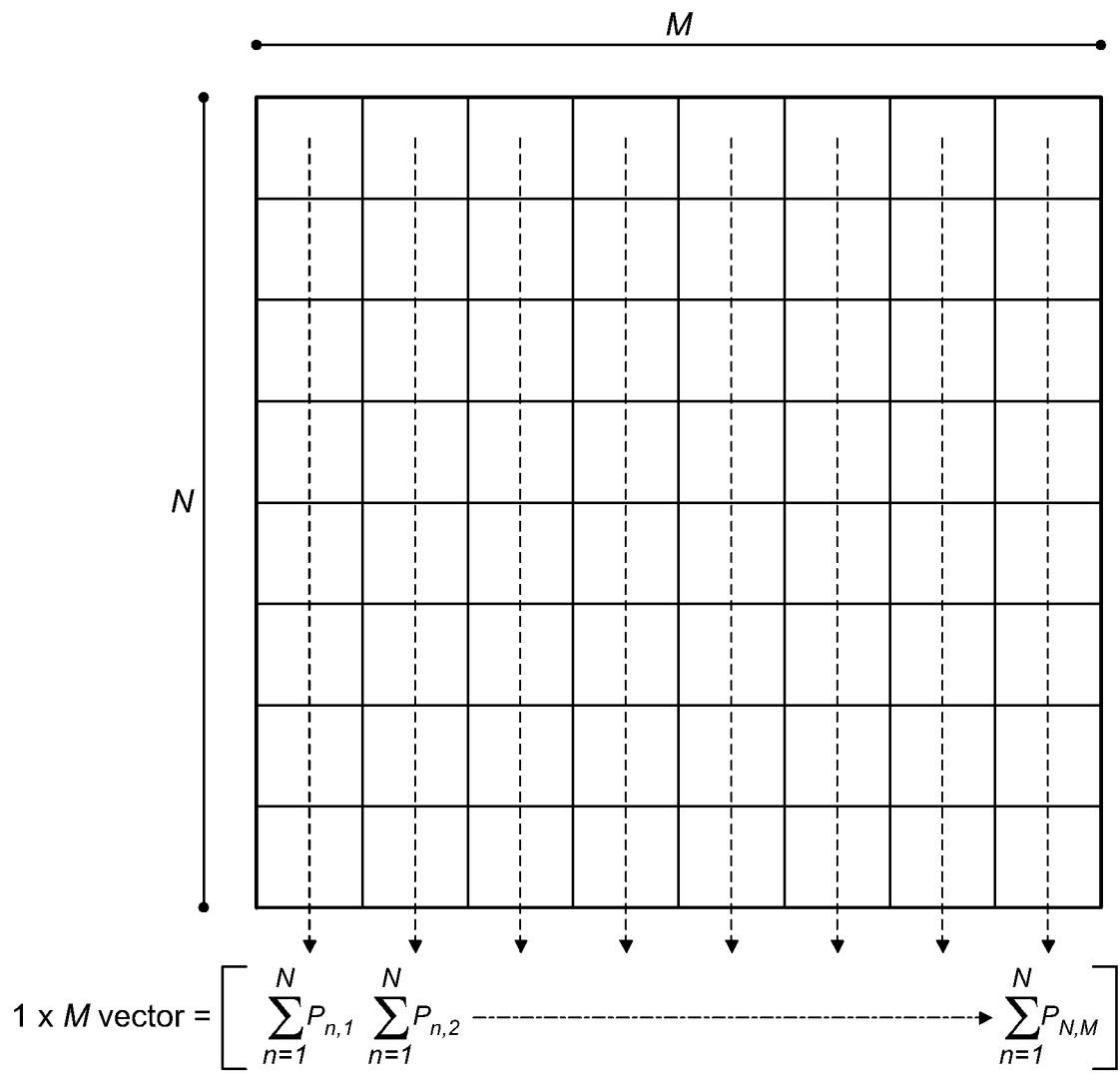
FIG. 11 is a schematic image of the array of detector pixels at the detector.

Thus, a 1×M dimensional data vector may be generated, each element of the data vector comprising the sum of the number of photoelectrons detected in each of the N pixels in a column of an N×M array of detector pixels (as illustrated at FIG. 11). In the specific case of FIG. 8, the plot was generated after further binning of the M columns of the array to a representative 128 channels, in order to reproduce the spatial resolution of prior art detectors. Nevertheless, a potential improvement provided by an increase in the available number of channels will be evident to the skilled person (even if presently the resolution is determined by the geometry of the analyser).

Figure 9:
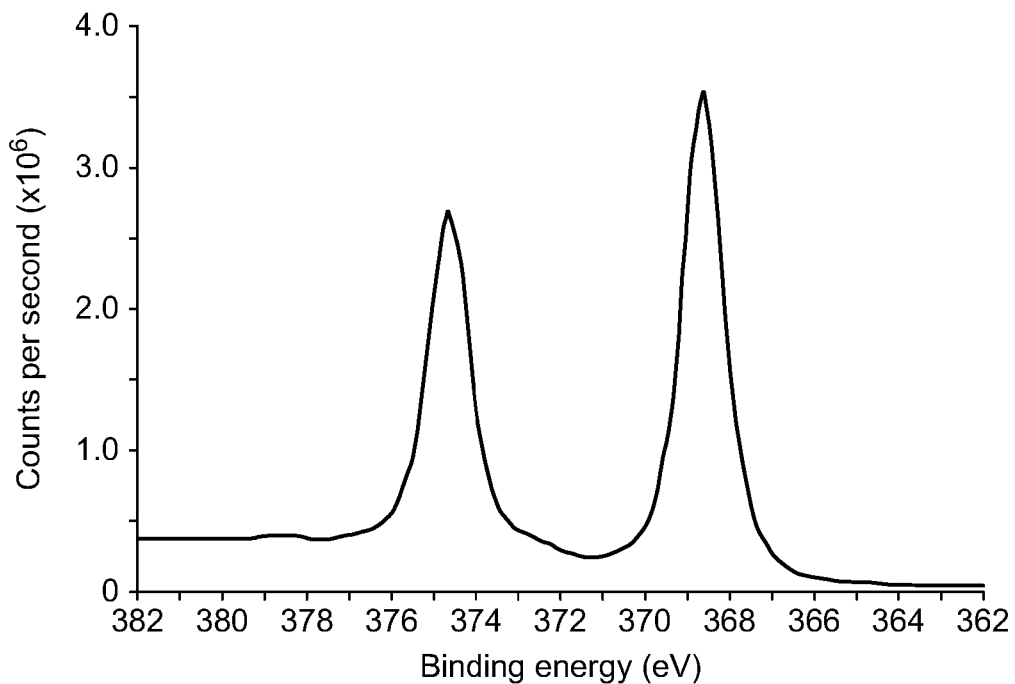
FIG. 9 is a plot showing an example "scanned" spectra using the described apparatus.

FIG. 9 shows a "scanned" spectra obtained using the described detector assembly mounted in a Thermo Scientific™ Nexsa™ XPS spectrometer. To generate the scanned spectra, the set of operational parameters of the electrostatic hemispherical analyser and the potentials at the electrostatic lens arrangement were adjusted (or stepped) to scan a particular range of electron energies, known to coincide with a spectroscopic position (or spectroscopic peak) of interest. A count of the charged particles received at each detecting pixel of the array during the dwell time for each set of operational parameters was then recorded, and undergoes data processing to generate the plot.

It should be noted that whilst the operational parameters of the analyser are scanned, the voltages applied to each element in the electrostatic lens arrangement are also adjusted simultaneously in order to provide an appropriate acceleration to the photoelectrons (or charged particles) exiting the analyser. In particular, the electrostatic lens arrangement is configured to ensure that the photoelectrons (or charged particles) received from the analyser are accelerated to at least the detection energy threshold. The relationship between the adjustment of the operational parameters of the analyser and the adjustment of the electrostatic lens arrangement is pre-defined, and may be constant.

To generate the scanned spectra of FIG. 9, for each set of operational parameters, a 1×M data vector is generated representative of the charged particle count at the M columns of pixels in the detector during the respective dwell time. As such, a plurality of 1×M data vectors are generated as the count is repeated for each set of operational parameters of the analyser. Each element of each data vector can be associated with an increment of energy of the particle, as a result of the known relationship between energy and positional dispersion of particles by the analyser. Consequently, each element of each data vector may be binned with other data elements representative of the same energy increment. In this way, the scanned spectra of FIG. 9 subsequently can be generated, plotted across the range of input particle energies. As such, the scanned spectra can be considered as a sum of many, energy shifted, snapshot spectra, as described above (and in particular, measured with a comparatively low pass energy).

The scanned spectra of FIG. 9 demonstrates a custom energy range than compared to the snapshot spectra of FIG. 8. For instance, the snapshot spectrum may be around 13.6% of the pass energy (e.g. ~13 eV for 100 eV pass energy). In comparison, the energy range of the scanned spectra is customised, for instance if looking to the singlet line, it can be only 3-4 eV. The apparent increased count rate of the scanned spectra compared to the snapshot spectra (increased by as much as 100 times) is a result of the addition of a large number of individual scans, each at a different set of operational parameters for the analyser. As a result a higher resolution is achieve, with more detail visible in the scanned spectra compared to the snapshot spectra. In general, the snapshot spectra illustrated in FIG. 8 can be used to speed up the process of data collection, or instance where resolution (or chemistry information) is not required.

In addition to the snapshot and scanned spectra described, X-ray photoelectron spectrometry (XPS) often looks to provide a "survey" spectrum across a much wider range of binding energies. In most cases, an XPS survey spectrum results in a spectra of photoelectron energies from about 50 eV to 1486 eV (which is the X-ray energy range of the most commonly used XPS radiation source). Such a spectrum may be useful to cover the entire possible range of emitted photoelectrons from a sample. The survey spectrum may be useful to identify spectroscopic features of interest in the sample, and then a scanned spectrum can be obtained with a much higher resolution, directed to an identified region of interest.

Figure 10:
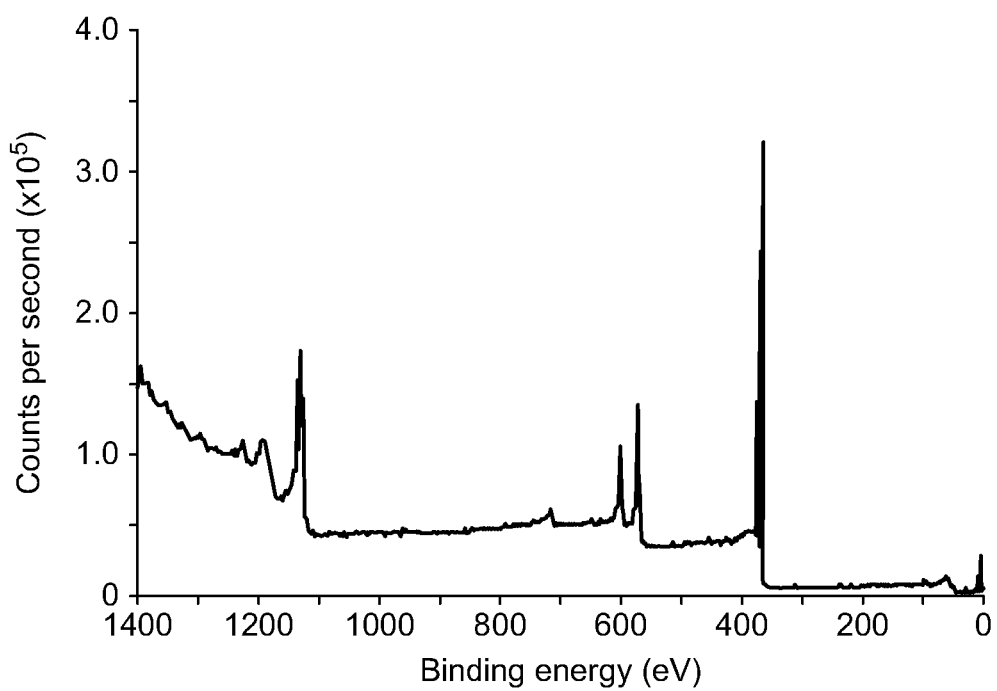
FIG. 10 is a plot showing an example "survey" spectra using the described apparatus.

A survey spectrum obtained using the described detector assembly mounted in a Thermo Scientific™ Nexsa™ XPS spectrometer is shown in FIG. 10. The spectrometer was programmed to scan across a wide range of energies corresponding to all available XPS peaks, while the operational parameters of the electrostatic hemispherical analyser and the potentials at the electrostatic lens arrangement were adjusted and/or scanned accordingly. Essentially, the method of generation of the survey spectrum is the same as that for the scanned spectra, as described above, including the data processing steps described. However, to generate a survey spectra a higher pass energy is used at the analyser, resulting in lower resolution and greater particle throughput. In addition, the step size of the parameters of the analyser (equivalent the step size of the particle energies analysed) is increased compared to the scanned spectra. In this way, the survey spectra provides a scanned spectra with a greater range, but lower energy resolution.

Although a number of factors contribute to the measured energy resolution in spectroscopic techniques such as XPS (including the size of the analyser input slit, and the hemispherical analyser radii, etc.) by using the described method and apparatus to generate a spectrum, it has been demonstrated that a particularly high energy resolution spectrum can be obtained compared to prior art systems. In principle the described system could be used to decode the position of a charged particle received on the detector surface to the resolution of number of columns of pixels offered by a detector (which is potentially much higher than that offered by the prior art). Moreover, the described method and apparatus achieve an extremely high count rate, without the pulse pile up and overlapping pulses at high count rates observed in traditional microchannel plate detectors. Count rates of more than 500 mega counts per second have been shown to be possible. In particular, the higher count rate is achieved as a result of the large number of pixels (e.g. over 64,000 in a single, typical active pixel array) and the dedicated counter at each pixel of the detector, with fast signal generation and recovery. Furthermore, the use of the described detectors means that, compared to traditional detectors used in XPS, coincident arrival of electrons in separate, adjoining pixels does not present a problem.

Figure 12:
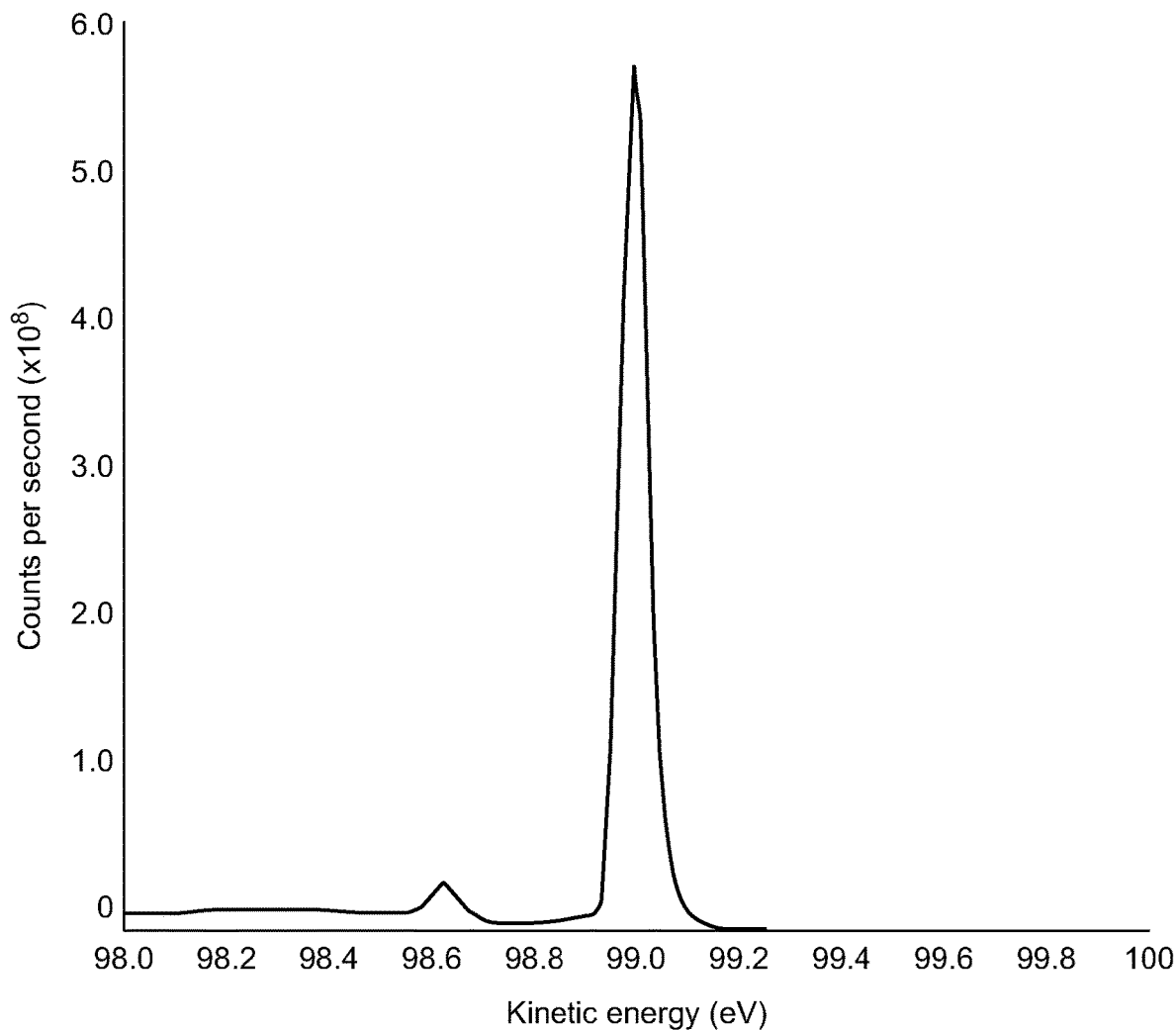
FIG. 12 is a plot showing an example reflected electron energy loss spectroscopy spectra.

The apparatus described above in relation to FIGS. 1 to 3 can advantageously be applied in a number of different types of spectroscopy. In a further example, FIG. 12 shows a Reflected Electron Energy Loss Spectroscopy (REELS) spectrum obtained using the described detector and electrostatic lens arrangement. The spectrum shows a peak count rate of 571 mega counts per second. Beneficially, this count rate is more than 10 times higher than might be achieved with a conventional channel plate detector. In addition, the background count rate is typically less than 1 count per second, thereby giving a dynamic range of around a billion to one.

It will be understood that the described data processing (including generating the described 1×M dimensional data vectors and binning said data vectors to generate spectra) can take place at a computer processor in communication with the described apparatus. Specifically, the processor may be connected to the described apparatus via the fibre optic link illustrated in FIGS. 5A and 5B, FIG. 6 and FIG. 7. The described data processing may take place during or post the data collection period at the processor.

Many combinations, modifications, or alterations to the features of the above embodiments will be readily apparent to the skilled person and are intended to form part of the invention. Any of the features described specifically relating to one embodiment or example may be used in any other embodiment by making the appropriate changes.

For example, in much of the above description the detectors are used in a 'spectroscopy mode'. Spectroscopy mode assumes that the analysis of the sample relies on spatial or temporal dispersion of charged particles in the spectroscopic analyser according to their energy distribution. For instance, spatial dispersion of photoelectrons in XPS causes photoelectrons of different energy to be incident on a detection surface of the detector at different positions (and more specifically, at different columns of the pixel array). In the alternative, temporal dispersion of the charged particles by the spectroscopic analyser (for example, in a time-of-flight analyser), causes charged particles of different energies to be retarded in an analyser field by different amounts and so exit the analyser and subsequently be received at the detection surface of the detector at different times. In the case of temporal dispersion of the particles, the fast read-out of the herein described detectors are particularly beneficial compared to conventional methods of charged particle detection.

However, the same detectors as described above (having an array of detecting, active pixels) can be used in further applications, such as an 'imaging mode' to obtain two dimensional data sets. Specific examples of include use of the detector in XPS imaging or angle resolved spectroscopy, within the Thetaprobe™ and the Escalab™ systems from Thermo Fisher Scientific™. In these cases, read-out from each of the detecting pixels in the detector pixel array can be independently stored and plotted, to obtain a two-dimensional image or plot. The images can be shown to have very high image resolution, with a particularly high count rate. Furthermore, parallel imaging applications benefit from a detector offering near zero background.

In a still further example, the detectors described above (having an array of detecting, active pixels) may also be used to directly measure the energy of a received charged particle (i.e. in an 'energy sensing mode'). In this case, the pixel electronics do not include a counter, and are arranged to provide a digital signal representative of the energy of received particles. Nevertheless, other components and methods of data processing described above could be used when applying the detectors in an energy sensing mode. In particular, after exit from an analyser, the charged particles should be accelerated before being incident directly on a surface at the conversion layer of the detector. Specifically, all the charged particles should be accelerated at least above a threshold energy, below which detection of particles at the detector becomes unreliable.

In a 'spectroscopy mode', particles must be accelerated in by the above described at least one electrostatic lens in order to exceed at least a detection threshold energy. However, in an 'energy sensing mode' the relative velocity (or energy) between the charged particles at the exit to the spectroscopic analyser and when incident at the surface of the detector would need to be kept constant for all particles (in other words, a constant relationship), whilst also exceeding at least a detection threshold energy.

The invention claimed is:

1. A method for detection of charged particles in spectroscopy, the method comprising:
   accelerating charged particles, received from an energy dispersive spectroscopic analyser as a charged particle beam, towards a detector; and receiving the accelerated charged particles at an array of detecting pixels, the array of detecting pixels forming the detector, wherein the charged particles arriving at the detector have a spread in the energy dispersive direction.

2. The method of claim 1, wherein each detecting pixel is an active detecting pixel comprising a semiconductor diode.

3. The method of claim 2, wherein each detecting pixel is associated with an amplifier, a comparator and a counter.

4. The method of claim 1, wherein the charged particles are accelerated to at least a detection energy threshold, the detection energy threshold being the minimum energy of a charged particle for detection of the charged particle incident at a detecting pixel of the detector.

5. The method of claim 1, wherein, prior to receiving the accelerated particles at the detector, the method further comprising:
focussing the charged particle beam to change the magnification of the beam at the image plane at the detector.

6. The method of claim 5, wherein focussing the charged particle beam to change the magnification of the charged particle beam comprises changing the cross-sectional area of the charged particle beam at the focal plane such that the width of the charged particle beam in the energy dispersive direction substantially matches the corresponding dimension of the array of detecting pixels at the detector.

7. The method of claim 1, wherein charged particle optics arranged between the spectroscopic analyser and the detector accelerates the charged particles.

8. The method of claim 7, wherein the charged particle optics are further configured to focus the charged particles.

9. The method of claim 1, wherein the spectroscopic analyser is operated in an imaging mode such that each charged particle is incident at the detector at a detecting pixel that is representative of a position in a sample from which the charged particle has originated.

10. The method of claim 1, wherein the energy dispersive spectroscopic analyser disperses the charged particles such that each charged particle is incident at the detector at a column of detecting pixels that is representative of the energy of the charged particle.

11. The method of claim 1, wherein the detector comprises an array of N rows and M columns of detecting pixels, wherein the method further comprises:
determining the number of charged particles received at each of the N×M detecting pixels.

12. The method of claim 11, wherein the method further comprises:
for each column of N detecting pixels, summing the number of charged particles determined to have been received at each detecting pixel in the column of detecting pixels, to determine a 1×M dimensional data vector comprising the sum for each column of N detecting pixels, the 1×M dimensional data vector representative of the spatial dispersion of the charged particles across one dimension of the image plane of the detector.

13. An apparatus for detection of charged particles in spectroscopy, comprising:
charged particle optics; and
an array of detecting pixels forming a detector;
wherein the arrangement of charged particle optics is configured to accelerate charged particles received from an energy dispersive spectroscopic analyser as a charged particle beam towards the detector, to be received at the array of detecting pixels; and
wherein the energy dispersive spectroscopic analyser causes the charged particle beam to arrive at the detector having a spread in the energy dispersive direction.

14. The apparatus of claim 13, wherein each detecting pixel is an active detecting pixel comprising a semiconductor diode.

15. The apparatus of claim 14, wherein each detecting pixel is connected to an amplifier, a comparator and a counter.

16. The apparatus of claim 13, wherein the charged particle optics are configured to accelerate the charged particles to at least a detection energy threshold, the detection energy threshold being the minimum energy of a charged particle for detection of the charged particle incident at a detecting pixel of the detector.

17. The apparatus of claim 13 wherein the charged particle optics are further configured to focus the charged particle beam to change the magnification of the beam at the image plane at the detector.

18. The apparatus of claim 17, wherein charged particle optics are configured to change the magnification of the charged particle beam, such that the width of the charged particle beam in the energy dispersive direction substantially matches the corresponding dimension of the array of detecting pixels at the detector.

19. The apparatus of claim 17, wherein the charged particle optics comprise at least two lens elements, the at least two lens elements arranged to focus and accelerate the charged particles.

20. The apparatus of claim 13, wherein the spectroscopic analyser is operated in an imaging mode such that each charged particle is incident at the detector at a pixel that is representative of a position in a sample from which the charged particle has originated.

21. The apparatus of claim 13, wherein the energy dispersive spectroscopic analyser disperses the charged particles such that each charged particle is incident at the detector at a column of pixels that is representative of the energy of the charged particle.

22. The apparatus of claim 13, wherein the detector comprises an array of N rows and M columns of detecting pixels, wherein the apparatus further comprising a controller configured to:
determine the number of charged particles received at each of the N×M detecting pixels.

23. The apparatus of claim 22, wherein the controller is further configured to:
for each column of N detecting pixels, sum the number of charged particles determined to have been received at each detecting pixel in the column of detecting pixels, to determine a 1×M dimensional data vector comprising the sum for each column of N detecting pixels, the 1×M dimensional data vector representative of the spatial dispersion of the charged particles across one dimension of the image plane of the detector.

24. An X-ray photoelectron spectrometer comprising:
a detection system including:
charged particle optics; and
an array of detecting pixels forming a detector;
wherein the arrangement of charged particle optics is configured to accelerate charged particles received from an energy dispersive spectroscopic analyser as a charged particle beam towards the detector, to be received at the array of detecting pixels, and wherein the energy dispersive spectroscopic analyser causes the charged particle beam to arrive at the detector having a spread in the energy dispersive direction; and
an electrostatic hemispherical analyser;
wherein an arrangement of charged particle optics is configured to accelerate photoelectrons received from the electrostatic hemispherical analyser towards the array of detecting pixels forming the detector.

* * * * *